US012229620B2

(12) United States Patent
Pearce

(10) Patent No.: US 12,229,620 B2
(45) Date of Patent: Feb. 18, 2025

(54) PASSIVE READER AND ACTIVE RECEIVER/TRANSMITTER DEVICES FOR LOGISTICS TRACKING

(71) Applicant: PRhObe Inc., Fremont, CA (US)

(72) Inventor: Stephen Pearce, Fremont, CA (US)

(73) Assignee: PRhObe Inc., Orinda, CA (US)

( * ) Notice: Subject to any disclaimer, the term of this patent is extended or adjusted under 35 U.S.C. 154(b) by 0 days.

(21) Appl. No.: 18/763,479

(22) Filed: Jul. 3, 2024

(65) Prior Publication Data

US 2025/0013837 A1 Jan. 9, 2025

Related U.S. Application Data

(60) Provisional application No. 63/525,059, filed on Jul. 5, 2023.

(51) Int. Cl.
*G06K 7/10* (2006.01)
*G06K 7/00* (2006.01)

(52) U.S. Cl.
CPC ....... *G06K 7/10306* (2013.01); *G06K 7/0008* (2013.01); *G06K 7/10099* (2013.01); *G06K 7/10405* (2013.01)

(58) Field of Classification Search
CPC .............. G06K 7/10306; G06K 7/0008; G06K 7/10099; G06K 7/10405; H04L 9/3236; G06F 13/4282; H04W 4/029; H04W 12/10
See application file for complete search history.

(56) References Cited

U.S. PATENT DOCUMENTS

| | | | |
|---|---|---|---|
| 6,745,027 B2 * | 6/2004 | Twitchell, Jr. | ......... G06Q 10/06 455/500 |
| D819,468 S | 6/2018 | Komoni et al. | |
| D823,792 S | 7/2018 | Komoni et al. | |
| D866,460 S | 11/2019 | Komoni et al. | |
| 10,482,419 B2 | 11/2019 | Komoni | |
| D869,301 S | 12/2019 | Komoni et al. | |
| 10,867,508 B2 | 12/2020 | Komoni et al. | |
| 11,042,829 B2 | 6/2021 | Komoni | |

(Continued)

OTHER PUBLICATIONS

Chainway CMX10-01 Brochure, Shenzhen Chainway Information Technology Co., Ltd (Apr. 2022).

(Continued)

*Primary Examiner* — Vernal U Brown
(74) *Attorney, Agent, or Firm* — The Webb Law Firm

(57) ABSTRACT

A receiver/transmitter device for logistics tracking configured to monitor or detect a shipment unit includes: a cellular transmitter for transmission of wireless signals via a cellular network; an ultra-wide band (UWB) transmitter for transmission of radio signals over a short-range network; a radio frequency identification (RFID) reader configured to detect a passive RFID tag associated with the shipment unit; and a processor in communication with the cellular transmitter, UWB transmitter, and RFID reader. The processor is configured to selectively cause the cellular transmitter or the UWB transmitter to wirelessly transmit information detected by the RFID reader to a remote computing device or computer server. The device also includes a housing configured to be mounted to a transport platform that encloses the cellular transmitter, UWB transmitter, RFID reader, and processor.

20 Claims, 15 Drawing Sheets

(56) References Cited

U.S. PATENT DOCUMENTS

| | | | |
|---|---|---|---|
| 11,244,559 B2 | 2/2022 | Komoni et al. | |
| D949,664 S | 4/2022 | Komoni et al. | |
| 11,637,705 B2 | 4/2023 | Komoni | |
| 2005/0215280 A1 | 9/2005 | Twitchell, Jr. | |
| 2008/0136624 A1* | 6/2008 | Twitchell | G08C 17/02 340/539.22 |
| 2014/0194937 A1* | 7/2014 | Asnis | A61F 2/0811 606/316 |
| 2018/0046980 A1 | 2/2018 | Siminoff | |
| 2018/0249292 A1 | 8/2018 | Skaaksrud | |
| 2018/0350227 A1 | 12/2018 | Komoni | |
| 2019/0235092 A1 | 8/2019 | Bastian, II et al. | |
| 2020/0090498 A1 | 3/2020 | Komoni | |
| 2020/0128358 A1 | 4/2020 | Komoni et al. | |
| 2021/0312385 A1 | 10/2021 | Komoni | |
| 2022/0147922 A1* | 5/2022 | Cawse | H04W 4/38 |
| 2022/0156688 A1* | 5/2022 | Green | G16Y 30/00 |
| 2022/0237556 A1 | 7/2022 | Schneider | |
| 2022/0300892 A1* | 9/2022 | Volkerink | G06Q 10/0833 |

OTHER PUBLICATIONS

DW3000 UWB Transceiver Datasheet, Decawave (2020).
Impinj E900 Series RAIN RFID Reader Chips, Impinj, Inc. (2012-2022).
NRF9160 DK Hardware v1.1.0 User Guide, Nordic Semiconductor ASA (Apr. 2022).
NRF52840 Preview Development Kit v0.9.x User Guide, Nordic Semiconductor ASA (2016).
Product Brief, DWM1001-Dev, Decawave (2017).
RAIN RFID single chip reader EPC Class 1, Gen 2 compatible, STMicroelectronics NV (2021).
SODAQ Track Stealth Brochure, SODAQ Engineering B.V. (2023).

* cited by examiner

PASSIVE READER AND ACTIVE RECEIVER/TRANSMITTER DEVICES FOR LOGISTICS TRACKING

CROSS REFERENCE TO RELATED APPLICATION

The present application claims the benefit of U.S. Provisional Patent Application No. 63/525,059 filed Jul. 5, 2023, the disclosure of which is hereby incorporated by reference in its entirety.

BACKGROUND OF THE INVENTION

Field of the Invention

The present disclosure is directed to receiver/transmitter devices with a passive reader(s) and an active receiver/transmitter(s) for logistics tracking, as well as to transport platforms (e.g., pallets, containers, packages, or other enclosures) tagged with or including such receiver/transmitter devices, systems for detecting and monitoring shipping information obtained from such receiver/transmitter devices, and methods for obtaining and analyzing location and status information from the receiver/transmitter devices.

Description of Related Art

Current shipment networks often rely on coordinating many shipments from large distribution centers. There is inefficiency with such large distribution centers due to unnecessary vehicle trips and missed opportunities for combining shipment units and deliveries. While distribution centers attempt to address this lack of efficiency by improving scheduling, optimizing delivery efficiency requires substantial information about shipment times and locations. Current distribution center shipment networks often only track shipment movement at the truck or trailer level meaning that information about movement of individual shipment units is not recorded or available. Such information could be used for strategically timing deliveries, maximizing vehicle fill, and minimizing unnecessary journeys.

More particularly, conventional systems for tracking pallets and other shipped products often use standard barcodes or QR codes read by handheld or fixed readers at transit points within a shipping network. Beneficially, the current barcode/passive-RFID technologies offer affordable (~$0.05/item) tracking options. However, barcode reading (e.g. using handheld or fixed readers) at transit points is labor intensive and offers no heat/shock/vibration exposure detail between transit points.

Active transmitter devices (e.g., UWB enabled devices) can also provide more robust tracking information. For examples, active tag transmitter devices (e.g., Apple® AirTag) emit signals that can be detected by short-range communication networks. However, such active devices have high labor/unit costs and may not provide in-transit status over the road or at sea. Some other shipping systems use Bluetooth Low Energy (BLE), relying on third parties for gateways to the cloud and requiring powered RF energizers or batteries to activate BLE. In some cases, shipment facilities can be outfitted with infrastructure (e.g., stationary readers and detectors throughout a shipping facility), often at high cost, creating on-premises systems for communication with active (UWE or BLE) tagging devices increasing location accuracy and delivering more precise local asset management within a shipment facility. However, despite the relatively high cost, these on-premises systems do not provide precise information outside of the facility, let alone globally.

Tags and other devices for cellular-only tagging with varying form factors/battery longevity for global tracking are also currently in use. Costs for cellular transmitters are even higher than UWB-enabled devices and do not offer fine location tracking. In particular, cellular-based tracking eliminates manual labor and can offer heat, shock, and vibration detail but involves high tag costs (>$50/item journey). By contrast, UWB or Bluetooth Low Energy (BLE) technologies (e.g., Zebra) reduce tag cost to ~$20+ but require the on-premises infrastructure described above, which limits location-detection to premise boundaries.

In view of such challenges with existing systems and devices, there is a need in the art for cost-effective tracking devices or tags for logistics that accurately determine location and provide status information both at a shipment facility and throughout a journey. Furthermore, there is a need for systems and software configured to process data accumulated from such tracking devices in order to monitor shipment progress and to provide useful information about overall environmental impact of shipping activities. The devices, systems, and methods of the present disclosure are configured to address these issues.

SUMMARY OF THE INVENTION

According to an aspect of the present disclosure, a receiver/transmitter device for logistics tracking configured to monitor or detect at least one shipment unit includes: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the at least one shipment unit; and at least one processor in communication with the at least one cellular transmitter, at least one UWB transmitter, and at least one RFID reader. The at least one processor is configured to selectively cause the at least one cellular transmitter or the at least one UWB transmitter to wirelessly transmit information detected by the RFID reader to a remote computing device or computer server. The device also includes a housing configured to be mounted to a transport platform that encloses the at least one cellular transmitter, at least one UWB transmitter, at least one RFID reader, and at least one processor.

According to another aspect of the present disclosure, a transport platform for detection of one or more shipment units secured thereto includes a base with a frame and a plurality of elongated members mounted to the frame defining a supporting surface for the one or more shipment units. The transport platform also includes at least one of receiver/transmitter device mounted within a gap between adjacent elongated members of the plurality of elongated members. The receiver/transmitter device includes: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the one or more shipment units; and at least one processor in communication with the at least one cellular transmitter, at least one UWB transmitter, and at least one RFID reader. The at least one processor is configured to selectively cause the at least one cellular transmitter or the at least one UWB transmitter to wirelessly transmit information detected by the at least one RFID reader to a remote computing device or computer server. The receiver/transmitter device also includes a housing mounted to the plurality of elongated members of the base that encloses the at least one cellular transmitter, at least one UWB transmitter, at least one RFID reader, and at least one processor.

According to another aspect of the present disclosure, a system for logistics tracking for monitoring shipment units within a shipping network includes a plurality of receiver/transmitter (R/T) devices mounted to transport platforms for the shipment units. The plurality of receiver/transmitter devices include: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the shipment unit; and at least one R/T device processor in communication with the at least one cellular transmitter, at least one UWB transmitter, and at least one RFID reader. The plurality of receiver/transmitter devices also include a housing configured to be mounted to a transport platform that encloses the at least one cellular transmitter, at least one UWB transmitter, least one RFID reader, and at least one processor. The system also includes a remote computing device or server with at least one processor in wireless communication with the at least one R/T processor of the plurality of receiver/transmitter devices. The at least one processor of the remote computing device or server is configured to: receive and process signals emitted from the plurality of receiver/transmitter devices; determine location and status information for the shipment units secured to the transport platforms based on the received and processed signals; and generate or update a location database comprising the determined location and status information for shipment units within the shipment network.

According to another aspect of the present disclosure, a computer implemented method for shipment tracking includes: wirelessly receiving signals from a plurality of any of the previously described receiver/transmitter devices via at least one computer processor of a remote computing device; with the at least one computer processor, determining location and status information for one or more shipment units associated with the plurality of receiver/transmitter devices; and generating or updating a location database including the determined location and status information for the one or more shipment units stored on the remote computing device.

According to another aspect of the present disclosure, a vehicle configured for use in a delivery network includes: a trunk configured to contain at least one shipment unit for delivery; and at least one receiver/transmitter device positioned within the trunk of the vehicle. The at least one receiver/transmitter device comprises at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the at least one shipment unit in the trunk; and at least one processor in communication with the at least one cellular transmitter, at least one UWB transmitter, and at least one RFID reader. The at least one processor is configured to selectively cause the at least one cellular transmitter or the at least one UWB transmitter to wirelessly transmit information detected by the RFID reader to a remote computing device or computer server. The at least one receiver/transmitter device also includes a housing configured to be mounted to the trunk that encloses the at least one cellular transmitter, at least one UWB transmitter, at least one RFID reader, and at least one processor.

According to another aspect of the present disclosure, a system for determining total carbon emissions for a shipping activity for at least one shipment unit of a plurality of shipment units includes a plurality of receiver/transmitter (R/T) devices mounted to transport platforms for the plurality of shipment units. The plurality of receiver/transmitter devices include: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the shipment unit; at least one R/T device processor in communication with the at least one cellular transmitter, at least one UWB transmitter, and at least one RFID reader; and a housing configured to be mounted to a transport platform that encloses the at least one cellular transmitter, at least one UWB transmitter, least one RFID reader, and at least one processor. The system also includes a remote computing device or server including at least one processor in wireless communication with the at least one R/T processor of the plurality of receiver/transmitter devices. The at least one processor of the remote computing device or server is configured to: receive and process signals emitted from the plurality of receiver/transmitter devices; determine location and status information for the shipment units secured to the transport platforms based on the received and processed signals; determine a measured total carbon emissions for the plurality of shipment units based on the determined location and status information; and generate or update an emissions database comprising the determined location and status information and the measured total carbon emissions for the plurality of shipment units.

Non-limiting illustrative examples of embodiments of the present disclosure will now be described in the following numbered clauses.

Clause 1: A receiver/transmitter device for logistics tracking configured to monitor or detect at least one shipment unit, comprising: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the at least one shipment unit; at least one processor in communication with the at least one cellular transmitter, at least one UWB transmitter, and at least one RFID reader configured to selectively cause the at least one cellular transmitter or the at least one UWB transmitter to wirelessly transmit information detected by the RFID reader to a remote computing device or computer server; and a housing configured to be mounted to a transport platform that encloses the at least one cellular transmitter, at least one UWB transmitter, at least one RFID reader, and at least one processor.

Clause 2: The device of clause 1, wherein the housing has a maximum width of about 3.25 inches and a maximum height of about 0.625 inches.

Clause 3: The device of clause 1 or clause 2, wherein the housing is configured to fit between horizontal slats of the transport platform and comprises at least one fastener receiver configured to receive a fastener for securing the housing to one or more of the horizontal slats.

Clause 4: The device of clause 3, wherein the fastener comprises a screw, leveraged screw, nail, or bracket.

Clause 5: The device of clause 3 or clause 4, wherein the at least one fastener receiver is rotatable relative to the housing, such that, upon rotation, teeth on an outer surface of the fastener receiver dig into one or more of the horizontal slats for securing the housing to the transport platform.

Clause 6: The device of any of clauses 1-5, further comprising an adhesive pad attached to an exterior surface of the housing for mounting the housing to the transport platform.

Clause 7: The device of any of clauses 1-6, wherein the housing comprises a high visibility material.

Clause 8: The device of any of clauses 1-7, further comprising a QR code or passive RFID tag on an exterior surface of the housing for identifying individual receiver/transmitter devices when a battery of the receiver/transmitter device is fully deleted.

Clause 9: The device of any of clauses 1-8, further comprising a battery enclosed within the housing for providing power for the at least one cellular transmitter, at least one UWB transmitter, at least one RFID reader, and at least one processor.

Clause 10: The device of clause 9, wherein the battery is non-rechargeable, and the receiver/transmitter device is disposable providing at least 20,000 blinks that transmit the transmit detected information prior to depletion of the battery.

Clause 11: The device of any of clauses 1-10, further comprising a separate power bank configured to be connected to the transport platform in proximity to the receiver/transmitter device and electrically connected to the receiver/transmitter device for providing power for the at least one cellular transmitter, at least one UWB transmitter, at least one RFID reader, and at least one processor.

Clause 12: The device of clause 11, wherein the power bank is configured to provide about 5 years to about 10 years of intermittent operation at about at least 2000 cellular blinks per year.

Clause 13: The device of any of clauses 9-12, wherein the at least one processor is configured to apportion battery power from the battery by radio type providing about 90% of the battery power for the at least one cellular transmitter, about 9% of the battery power for the at least one RFID reader, and about 1% of the battery power for the at least one UWB transmitter.

Clause 14: The device of any of clauses 1-13, wherein the at least one processor is configured to receive location information based on signals received by the at least one UWB transmitter and/or the at least one RFID reader and to cease communication via the cellular transmitter when location information indicates that the receiver/transmitter device is within a facility including a UWB and/or RFID gateway.

Clause 15: The device of clause 14, wherein ceasing cellular communication comprises ceasing to apply power from a battery of the receiver/transmitter device to the at least one cellular transmitter.

Clause 16: The device of any of clauses 1-15, wherein the at least one cellular transmitter comprises global positioning system (GPS) circuitry for between premises location detection.

Clause 17: The device of any of clauses 1-16, wherein the at least one cellular transmitter comprises a self-locating cellular transceiver.

Clause 18: The device of any of clauses 1-17, wherein the at least one cellular transmitter supports at least the following communication standards: NB-IoT, LTE-M, and CATM.

Clause 19: The device of any of clauses 1-18, wherein the at least one UWB transmitter is configurable to operate as an anchored UWB gateway at a shipping facility or warehouse for on premise detection of other mobile devices comprising UWB transmitters.

Clause 20: The device of any of clauses 1-19, further comprising a short-range data transmitter for Bluetooth® Low Energy (BLE) communication.

Clause 21: The device of any of clauses 1-20, wherein the at least one cellular transmitter, the at least one UWB transmitter, and the at least one RFID reader are disposed on a common printed circuit board.

Clause 22: The device of any of clauses 1-21, wherein the RFID reader has a range at least 1 meter.

Clause 23: The device of any of clauses 1-22, further comprising at least one environmental sensor enclosed within the housing configured for detection of at least one of temperature, humidity, shock, and/or vibration of or proximate to the receiver/transmitter device.

Clause 24: The device of any of clauses 1-23, wherein the at least one environmental sensor is configured to detect acceleration and temperature information for the receiver/transmitter device, and wherein the at least one processor is configured to modify power usage of the at least one cellular transmitter, at least one UWB transmitter, at least one RFID reader, or at least one processor based on detected changes in the acceleration and temperature information.

Clause 25: The device of clause 24, wherein the at least one processor is configured to increase a blink rate for communication of detected information for one or more of the at least one cellular transmitter or the at least one UWB transmitter upon the detected change in the acceleration or temperature information.

Clause 26: The device of any of clauses 1-25, further comprising at least one energy harvester enclosed within a separate housing and electrically connected to the at least one cellular transmitter, at least one UWB transmitter, at least one RFID reader, and/or at least one processor by an electrical cable.

Clause 27: The device of clause 26, wherein the energy harvester comprises a solar device comprising at least one solar cell or a vibration device for converting vibratory motion to electric current.

Clause 28: The device of any of clauses 1-27, wherein the at least one processor is configured to: cause the at least one cellular transmitter or the at least one UWB transmitter to wirelessly transmit the information from the at least one passive RFID tag detected by the RFID reader upon an initial detection of the at least one passive RFID tag; and subsequently cause the at least one cellular transmitter or the at least one UWB transmitter to periodically wirelessly transmit a confirmation that the at least one passive RFID tag remains within range of the at least one RFID reader to the remote computing device or computer server, wherein the transmitted confirmation is smaller in size than the information transmitted upon the initial detection of the at least one passive RFID tag.

Clause 29: A transport platform for detection of one or more shipment units secured thereto, comprising: a base comprising a frame and a plurality of elongated members mounted to the frame defining a supporting surface for the one or more shipment units; and at least one of receiver/transmitter device mounted within a gap between adjacent elongated members of the plurality of elongated members, the receiver/transmitter device comprising: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the one or more shipment units; at least one processor in communication with the at least one cellular transmitter, at least one UWB transmitter, and at least one RFID reader configured to selectively cause the at least one cellular transmitter or the at least one UWB transmitter to wirelessly transmit information detected by the at least one RFID reader to a remote computing device or computer server; and a housing mounted to the plurality of elongated members of the base that encloses the at least one cellular transmitter, at least one UWB transmitter, at least one RFID reader, and at least one processor.

Clause 30: The transport platform of clause 29, wherein the base comprises a standard shipping pallet configured to be moved by a conventional forklift or dolly.

Clause 31: The transport platform of clause 29 or clause 30, wherein the housing of the receiver/transmitter device has a maximum width of about 3.25 inches and is sized to fit between adjacent elongated members of the plurality of elongated members.

Clause 32: The transport platform of any of clauses 29-31, wherein the housing of the receiver/transmitter device comprises at least one fastener receiver configured to receive a fastener for securing the housing to one or more of the plurality of elongated members of the base.

Clause 33: The transport platform of clause 32, wherein the fastener comprises a screw, leveraged screw, nail, or bracket.

Clause 34: The transport platform of clause 32 or clause 33, wherein the at least one fastener receiver is rotatable relative to the housing of the receiver/transmitter device, such that, upon rotation, teeth on an outer surface of the fastener receiver dig into one or more of the plurality of elongated members for securing the housing to the base of the transport platform.

Clause 35: The transport platform of any of clauses 29-34, further comprising a separate power bank connected to the base of the transport platform in proximity to the receiver/transmitter device and electrically connected to the receiver/transmitter device for providing power for the at least one cellular transmitter, at least one UWB transmitter, at least one RFID reader, and at least one processor.

Clause 36: The transport platform of any of clauses 29-35, further comprising at least one energy harvester enclosed within a separate housing mounted to the base and electrically connected to the at least one cellular transmitter, at least one UWB transmitter, at least one RFID reader, and/or at least one processor by an electrical cable.

Clause 37: The transport platform of clause 36, wherein the energy harvester comprises a solar device comprising at least one solar cell or a vibration device for converting vibratory motion to electric current.

Clause 38: A system for logistics tracking for monitoring shipment units within a shipping network, the system comprising: a plurality of receiver/transmitter (R/T) devices mounted to transport platforms for the shipment units, wherein the plurality of receiver/transmitter devices comprise: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the shipment unit; at least one R/T device processor in communication with the at least one cellular transmitter, at least one UWB transmitter, and at least one RFID reader; and a housing configured to be mounted to a transport platform that encloses the at least one cellular transmitter, at least one UWB transmitter, at least one RFID reader, and at least one processor; and a remote computing device or server comprising at least one processor in wireless communication with the at least one R/T processor of the plurality of receiver/transmitter devices, the at least one processor of the remote computing device or server being configured to: receive and process signals emitted from the plurality of receiver/transmitter devices; determine location and status information for the shipment units secured to the transport platforms based on the received and processed signals; and generate or update a location database comprising the determined location and status information for shipment units within the shipment network.

Clause 39: The system of clause 38, wherein the at least one processor of the remote computing device or server is further configured to estimate an arrival time for a particular shipment unit based on the determined location and status information for the particular shipment unit.

Clause 40: The system of clause 39, wherein the at least one processor of the remote computing device or server is further configured to periodically update the estimated arrival time based on newly obtained location and status information for the particular shipment unit.

Clause 41: The system of any of clauses 38-40, wherein the at least one processor of the remote computing device or server is further configured to determine a measured total carbon emissions for a particular shipment unit based on the determined location and status information for the particular shipment unit.

Clause 42: The system of clause 41, wherein the plurality of receiver/transmitter devices further comprise at least one environmental sensor for measuring acceleration and/or temperature of the plurality of shipment units, and wherein the at least one processor of the remote computing device or server is configured to determine the measured total carbon emissions based, in part, on the acceleration or temperature of the particular shipment unit.

Clause 43: The system of clause 42, wherein the at least one processor is configured to identify a type of vehicle used for transport based on detected acceleration and wherein the measured total carbon emission is based, in part, on the identified type of vehicle.

Clause 44: The system of any of clauses 41-43, wherein the at least one processor of the remote computing device or server is further configured to provide estimates for carbon footprint of future shipment units based on the determine measured total carbon emissions for the particular shipment unit.

Clause 45: The system of clause 44, wherein the provided estimates comprise an alphanumeric sustainability metric value calculated based on the estimates for carbon footprint.

Clause 46: The system of any of clauses 38-45, wherein the plurality of receiver/transmitter devices are configured to detect passive RFID tagged items within a vicinity of the receiver/transmitter devices and to periodically communicate information about such passive-RFID tagged items to the remote computing device or server.

Clause 47: The system of clause 46, wherein periodic communication occurs via UWB when available and cellular when UWB is not available.

Clause 48: The system of clause 47, wherein a blink rate for the periodic communication is determined based on at least one of which communication transmitter is available, a charge remaining for a battery when the battery is providing power, and/or a power provided to a receiver/transmitter device of the plurality of receiver/transmitter devices by an energy harvesting device.

Clause 49: The system of clause 47 or clause 48, wherein the communication information can further comprise location information provided by at least one of Wi-Fi sniffing, a cellular E-911 network, the at least one UWB transmitter, and/or a global positioning network in communication with the at least one cellular transmitter.

Clause 50: The system of any of clauses 38-49, wherein the at least one processor of a particular receiver/transmitter device of the plurality of receiver/transmitter devices is configured to disable communication via the at least one cellular transmitter based on geofencing information received by the at least one UWB transmitter of the particular receiver/transmitter device.

Clause 51: The system of any of clauses 38-50, further comprising at least one anchored receiver/transmitter device configured to be connected to mains power and configurable to operate as an anchored UWB gateway at a shipping facility or warehouse for on premise detection of other mobile devices comprising UWB transmitters.

Clause 52: The system of clause 51, wherein the at least one UWB transmitters of the plurality of receiver/transmitter devices are configured to communicate with the at least one anchored receiver/transmitter device receiving location information from the at least one anchored receiver/transmitter device.

Clause 53: The system of clause 52, wherein the at least on anchored receipt/transmitter device comprises: at least one cellular transmitter for transmission of wireless signals via a cellular network; at least one ultra-wide band (UWB) transmitter for transmission of radio signals over a short-range network of UWB devices within the shipping facility; at least one radio frequency identification (RFID) reader configured to detect at least one passive RFID tag associated with the at least one shipment unit; at least one processor in communication with the at least one cellular transmitter, at least one UWB transmitter, and at least one RFID reader configured to selectively cause the at least one cellular transmitter or the at least one UWB transmitter to wirelessly transmit information detected by the RFID reader to a remote computing device or computer server; and a housing configured to be mounted to a transport platform that encloses the at least one cellular transmitter, at least one UWB transmitter, at least one RFID reader, and at least one processor, wherein the at least one cellular transmitter, at least one UWB transmitter, at least one RFID reader, and at least one processor are powered by mains power received by the at least one anchored receiver/transmitter device.

Clause 54: A computer implemented method for shipment tracking, comprising: wirelessly receiving signals from a plurality of the receiver/transmitter devices of any of clauses 1-28 via at least one computer processor of a remote computing device; with the at least one computer processor, determining location and status information for one or more shipment units associated with the plurality of receiver/transmitter devices; and generating or updating a location database comprising the determined location and status information for the one or more shipment units stored on the remote computing device.

Clause 55: A vehicle configured for use in a delivery network, the vehicle comprising: a trunk configured to contain at least one shipment unit for delivery; and at least one receiver/transmitter device positioned within the trunk of the vehicle, comprising: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the at least one shipment unit in the trunk; at least one processor in communication with the at least one cellular transmitter, at least one UWB transmitter, and at least one RFID reader configured to selectively cause the at least one cellular transmitter or the at least one UWB transmitter to wirelessly transmit information detected by the RFID reader to a remote computing device or computer server; and a housing configured to be mounted to the trunk that encloses the at least one cellular transmitter, at least one UWB transmitter, at least one RFID reader, and at least one processor.

Clause 56: The vehicle of clause 55, wherein the at least one receiver/transmitter device is electrically connected to a power system of the vehicle, and wherein the at least one cellular transmitter, at least one UWB transmitter, at least one RFID reader receive power from the vehicle power system.

Clause 57: A system for determining total carbon emissions for a shipping activity for at least one shipment unit of a plurality of shipment units, the system comprising: a plurality of receiver/transmitter (R/T) devices mounted to transport platforms for the plurality of shipment units, wherein the plurality of receiver/transmitter devices comprise: at least one cellular transmitter for transmission of wireless signals via a cellular network; at least one ultra-wide band (UWB) transmitter for transmission of radio signals over a short-range network; at least one radio frequency identification (RFID) reader configured to detect at least one passive RFID tag associated with the shipment unit; at least one R/T device processor in communication with the at least one cellular transmitter, at least one UWB transmitter, and at least one RFID reader; and a housing configured to be mounted to a transport platform that encloses the at least one cellular transmitter, at least one UWB transmitter, least one RFID reader, and at least one processor; and a remote computing device or server comprising at least one processor in wireless communication with the at least one R/T processor of the plurality of receiver/transmitter devices, the at least one processor of the remote computing device or server being configured to: receive and process signals emitted from the plurality of receiver/transmitter devices; determine location and status information for the shipment units secured to the transport platforms based on the received and processed signals; determine a measured total carbon emissions for the plurality of shipment units based on the determined location and status information; and generate or update an emissions database comprising the determined location and status information and the measured total carbon emissions for the plurality of shipment units.

Clause 58: The system of clause 57, wherein the plurality of receiver/transmitter devices further comprise at least one environmental sensor for measuring acceleration and/or temperature of the plurality of the plurality of shipment units, and wherein the at least one processor of the remote computing device or server is configured to determine the measured total carbon emissions based, in part, on the acceleration or temperature of the plurality of shipment units.

Clause 59: The system of clause 58, wherein the at least one processor is configured to identify a type of vehicle used for transport based on detected acceleration and wherein the measured total carbon emissions are based, in part, on the identified type of vehicle.

Clause 60: The system of any of clauses 57-59, wherein the at least one processor of the remote computing device or server is further configured to provide estimates for carbon footprint of future shipment units based on the determine measured total carbon emissions for the plurality of shipment units.

Clause 61: The system of clause 60, wherein the provided estimates comprise an alphanumeric sustainability metric value calculated based on the estimates for carbon footprint.

BRIEF DESCRIPTION OF THE DRAWINGS

These and other features and characteristics of the present disclosure, as well as the methods of operation and functions of the related elements of structures and the combination of parts and economics of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limit of the invention.

DESCRIPTION OF THE INVENTION

Figure 1A:
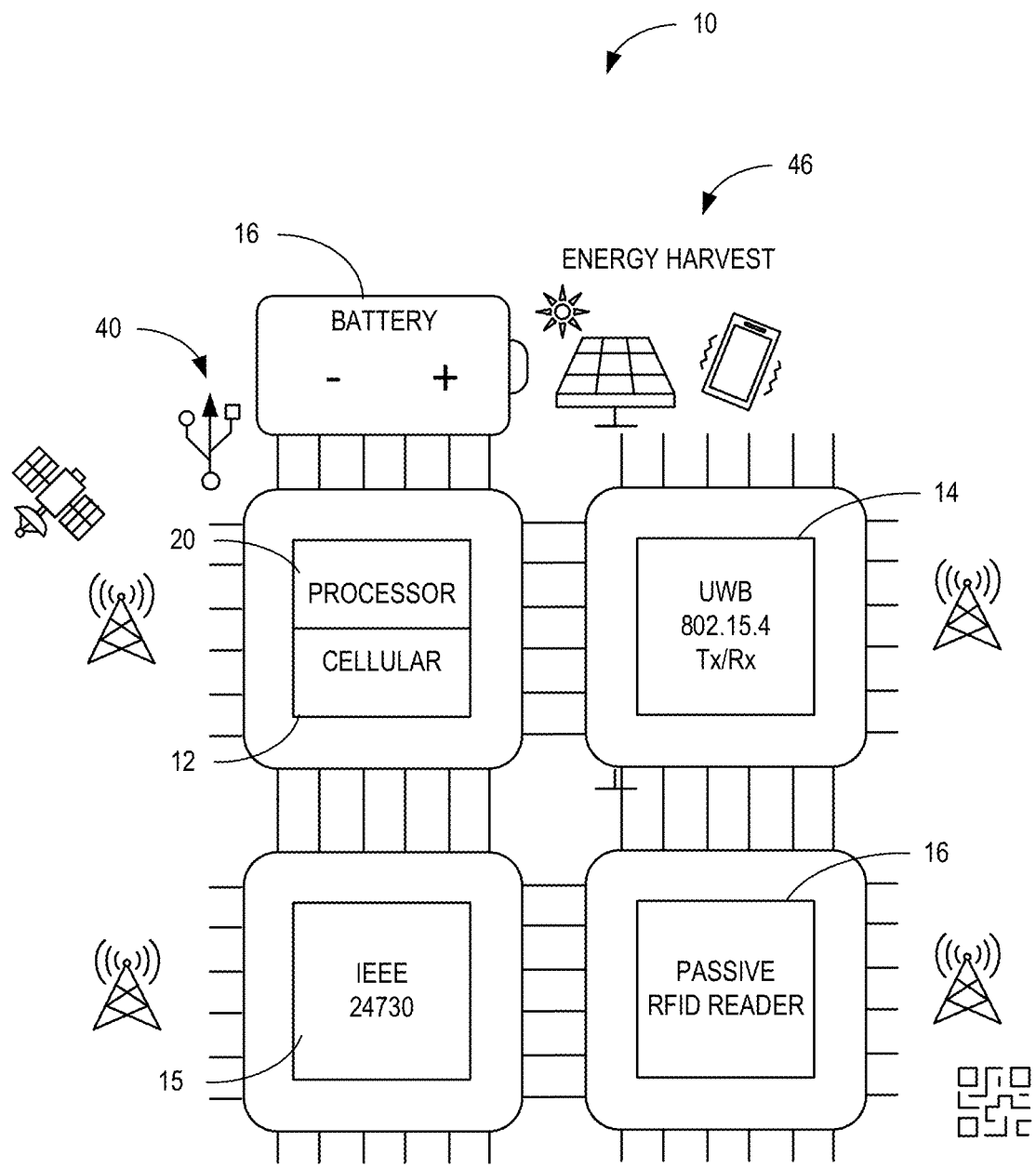
FIGS. 1A and 1B are schematic drawings of receiver/transmitter devices for logistics tracking, according to aspects of the present disclosure.

As used herein, the singular form of "a", "an", and "the" include plural referents unless the context clearly states otherwise.

As used herein, the terms "right", "left", "top", "bottom", and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

For the purposes of this specification, unless otherwise indicated, all numbers expressing, for example, dimensions, physical characteristics, and so forth used in the specification and claims are to be understood as being modified in all instances by the term "about." Unless indicated to the contrary, the numerical parameters set forth in the following specification and attached claims are approximations that can vary depending upon the desired properties sought to be obtained by the present invention. Notwithstanding that the numerical ranges and parameters setting forth the broad scope of the invention are approximations, the numerical values set forth in the specific examples are reported as precisely as possible. Any measured numerical value, however, may inherently contain certain errors resulting from the standard deviation found in their respective testing measurements.

As used herein, the terms "comprising," "comprise" or "comprised," and variations thereof, are meant to be open ended.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

The present disclosure is directed to receiver/transmitter devices 10 with a passive reader(s) and an active receiver/transmitter(s) utilizing various reception/transmission circuitry (e.g., cellular, RFID, ultra-wide band (UWB), etc.) for logistics tracking. The receiver/transmitter devices 10 disclosed herein can be used for shipment tracking for industries including, but not limited to, automotive, healthcare, medicine, food distribution, etc. The present disclosure is also directed to transport platforms (e.g., pallets, containers, packages, or other enclosures) tagged with or including the receiver/transmitter devices 10, as well as to systems for detecting and monitoring shipping data obtained from the receiver/transmitter devices 10 and methods for obtaining and analyzing location and status information for individual items (e.g., individual shipment or trade units) with the receiver/transmitter devices 10 in a shipping network. In particular, in some examples, received location and status information can be used to confirm location of particular shipment units and/or to create a detailed record of a journey for the particular shipment unit. As used herein, a "shipment unit" can refer to a single box, container, object, item, or package that has been prepared for shipping. Generally, a shipment unit is not intended to be opened, separated, or divided until arrival at a final destination. Beneficially, in some examples, detailed information about a journey for the particular shipment unit can be used for calculating a carbon footprint or total carbon emissions of the journey for the particular shipment unit.

The receiver/transmitter devices 10 disclosed herein are intended to improve supply chain efficiency by significantly increasing availability of accurate and precise information about location and status of individual shipment units. The real-time visibility for shipment units provided by the receiver/transmitter devices 10 can be a benefit for manufacturing industries by addressing issues like unknown arrival times, delays, shrinkage, and cold chain uncertainty. For example, having more complete shipment location information can be used by manufacturers to eliminate warehousing allowing product manufacturers to confidently anticipate when parts will arrive and depart from a manufacturing facility meaning that parts or finished product do not need to be stored in the warehouse for extended periods of time.

Economically viable individual product/item tracking, as provided by the receiver/transmitter devices 10 of the present disclosure, aims to address and solve many real-world logistics problems. For example, real-time visibility for shipment units can reduce inefficiency in medicine and food supply chains. It is estimated that about 40-95% of inefficiency in food production may be eliminated if producers are able to confidently time picking/packing for when a product is needed at a supermarket and to intercept in-transit spoilage. Similarly, real-time visibility for delivery of pharmaceuticals and medical/biological supplies may speed up certain therapies and/or ensure that biological samples and tissues arrive when needed and expected. For example, the receiver/transmitter device 10 can be used to track test sample transits (e.g., sending of test samples from a patient or collection facility to a testing facility). Currently, some tests are taken twice and shipped twice via different methods to avoid patient inconvenience associated with needing to re-test when samples fail to arrive as expected. In some instances, delays due to such logistics failures can even be life threatening preventing patients from receiving treatment in a timely manner. The receiver/transmitter devices 10 of the present disclosure could also be used to track sending of other biological tissues, such as organs for transplant. In some examples, accurate and precise location information may also be used for measuring carbon footprint or total carbon emissions attributable to shipping activities in order to comply with increasingly rigorous environmental regulations.

Modern shippers recognize that this accurate and precise shipment information, such as data for arrival times (locations) and integrity of items (including information on temperature, shock, and vibration damage exposure), is needed to optimize and improve efficiency of existing supply chains. However, according to some inquiries of shipping companies, while 77% of companies believe that this real-time visibility of shipment units is a must-have for a modern shipping network, only 25% of companies currently use any type of real-time trackers due to inadequate infrastructure, incompatible systems between carriers, and especially cost constraints. The receiver/transmitter devices 10 of the present disclosure are configured to address such concerns and, in particular, to provide serial number level shipment information in a cost effective and efficient manner.

In some examples, the receiver/transmitter devices 10 and systems of the present disclosure enable real-time tracking of shipment units using passive RFID tags associated with each unit. The receiver/transmitter devices 10 disclosed herein can also use global cellular networks, WiFi SSID sniff, and/or GPS (e.g., any global positioning system, such as GNSS, etc.) for between-premises or off-premises tracking, ultra-wideband for on premise location accuracy, and cellular, WiFi, BLE, and UWB for digital control. In some examples, the receiver/transmitter devices 10 can also include in-silicon sensors for monitoring condition information.

In some examples, the receiver/transmitter devices 10 can be implemented with and/or attached to physical transport platforms (such as pallets, containers, packages, or other enclosures), which carry multiple shipment units (items) (e.g., multiple shipment units tagged with passive RFID tags). The receiver/transmitter devices 10 can be configured to detect a passive RFID tag for each shipment unit on the transport platform, thereby linking each passively tagged item to a remote computing device or database (e.g., a cloud-based device) in order to provide real-time updates about shipment location and status. In some examples, the receiver/transmitter devices 10 can leverage existing cellular networks, eliminating additional infrastructure needed for location tracking, and provide operating longevity, third party software that can become device agnostic, and standardization that promotes cross-shipper compatibility with little to no labor cost.

More specifically, according to an aspect of the present invention, electronic receiver/transmitter devices 10 are provided that utilize standardized passive tagging, desirably at an ultra-low cost per item, combined with an active tag deployed on transport platforms, e.g. a pallet, shipping container, truck trailer, or car trunk. The transport platforms can be reusable or can be configured to be used only one time. The receiver/transmitter devices 10 can also be deployed in a vehicle (e.g., a cargo portion of a truck or van or an automobile trunk). The active tag can be a cellular tag, reading passively tagged shipment units during transit. The active tag can also update an electronic database stored on a remote computing device or server to provide real-time location and state/status information for particular shipment units effectively representing state/status information for the shipment unit throughout an entire journey.

According to another aspect of the disclosure, the receiver/transmitter devices 10 can employ cellular communication, ultra-wideband (UWB) technology, a passive RFID reader, and built-in silicon environmental sensors for monitoring shipment unit locations and conditions (temperature/shock/vibration exposures). During receiver/transmitter device message cycles (referred to herein as "blinks"), sensor and RFID readings are packed into cellular bursts with location information. The receiver/transmitter devices 10 can have several methods for determining location when off-premises (e.g., outside of a shipping or warehousing facility). In order of preference, the receiver/transmitter device 10 can be configured to determine location using one or more of the following: WiFI SSID sniff, cellular E911 location, and, as a last resort, using global positioning (GPS) circuitry associated with a cellular transceiver. However, using GPS is to be avoided due to high power requirements. In other examples, location information may be determined based on received Bluetooth® Low Energy (BLE) or UWB signals in order to provide compatibility with nearby cell phones, mobile router devices, and/or other mobile electronic devices. The location/status/state information is transmitted and added to a remote database, such as a cloud-based computer server. In particular, in some examples, each tagged item or shipment unit can be tracked by proximity to the transport platform and receiver/transmitter device 10 mounted to the transport platform. Because each shipment unit is separately identified and monitored, alerts for individual shipment units can be generated and transmitted to interested parties. Data transmission events or blinks to the remote computing device or server can occur periodically or in response to external factors, such as factors detected by the environmental sensors (e.g., changes in acceleration indicating that a vehicle is starting or stopping or changes in temperature). In some examples, geo-fencing optimization can be used to save battery life of the receiver/transmitter device 10. For example, over-the-road cellular "blinks" can be transmitted one per day, while UWB/WiFi blinks in a geo-fenced shipping facility can be transmitted one per hour.

In some examples, the receiver/transmitter device 10 can include a modular battery or power bank that enables different use cases. For example, the receiver/transmitter device 10 can operate with small disposable batteries capable of supporting about a thousand blinks (e.g., three blinks per day for about one year). When a modular battery or power bank is connected to the receiver/transmitter device 10, the receiver/transmitter device 10 may send from about one to twenty-four blinks per day for up to seven years or longer. Trucks/vans/cars with rechargeable batteries and vehicle power may operate indefinitely (blinking as needed, every few seconds to hours).

In some examples, the receiver/transmitter device 10 is configured to operate in at least two different operating modes. The first operating mode can involve largely battery operation. In a second main power operating mode, the receiver/transmitter device 10 can be configured to form a locationing infrastructure network, which can be deployed within a facility and provide locationing for the more mobile receiver/transmitter devices 10. In this operating mode, UWB communication is used to locate mobile receiver/transmitter devices 10. By contrast, other locationing technologies integrated over time can be used to achieve highly accurate fixed locations for the non-mobile infrastructure units and/or non-mobile receiver/transmitter devices 10. Therefore, the same receiver/transmitter device 10 can be configurable as either an anchor for a UWB network or a mobile UWB tag, which can be detected or queried by the UWB network. In some examples, the communications can also occur over WiFi within a facility once an anchor device has been commissioned. In examples, cellular connectivity may also help with commissioning. BLE and/or WiFi can also be a beacon based lower quality back-up location capability because these communications processes are available on both mobile and non-mobile receiver/transmitter devices 10.

In some examples, the receiver/transmitter devices 10 including UWB can be supported by and/or used with the Apple® "Find My" app. The "Find My" app includes the ability to measure proximity and even provides direction finding on a smart phone or similar electronic handheld device to direct a user to a UWB tag. UWB communication, when available, can also be used to conserve battery compared to cellular communication. UWB can also be used for short range communication, such as to communicate a notification to a truck driver about status of a shipment unit in a trailer or container of the truck. For example, a notification could be provided to a food delivery driver indicating that a take-out delivery has become too cold for customer satisfaction. In that case, a system could automatically discount the product to compensate for reduced quality.

In some examples, location or status information collected from the receiver/transmitter devices 10 can be securely stored in the cloud, enabling any properly authenticated individual to make use of the data in real-time to manage shipping/production. For example, as previously described, a cloud-based computing device or server can be configured to add shipment unit location/state/condition information to a remotely accessible digital database. The database can be accessed by shipping companies and customers to track shipment unit location and status during a journey.

It is believed that the receiver/transmitter devices 10, systems, and methods of the present disclosure will advance health and welfare of populations by avoiding loss attributable to shipping delays for food and medicine (e.g., pharmaceuticals, biological tissue, samples for testing). In particular, populations may benefit from cheaper/fresher food and faster access to healthcare deliveries. For example, real-time tracking for food shipments will allow for delayed shipments to be intercepted, replaced, or re-routed sooner and tracked backward/forward to identify food safety issues originating from the same location.

The receiver/transmitter devices 10, systems and methods disclosed herein can also contribute to optimization of shipping activities, including improvement of first-mile and last-mile connectivity, which can include opening doors when items arrive at destinations and/or opening doors for pick-up when they depart. In some examples, the receiver/transmitter devices 10 and shipment systems disclosed herein can also address inefficiencies due to unnecessary vehicle trips resulting from a failure to recognize opportunities to combine shipments and/to ship different transport units on the same vehicle. In particular, distribution systems with logistics information about each shipment unit passing through a shipment facility before arrival at a dock door, rather than using only individual transport/trailer level shipment information, will be able to slide deliveries in time to maximize vehicle fill and avoid multiple vehicle journeys.

In some examples, the receiver/transmitter devices 10 can also be used for improvement and optimization of micro-transit services, such as gig-based delivery services (e.g., Uber and Door Dash) using receiver/transmitter devices 10 deployed, for example, in a trunk of a vehicle. For example, deployed receiver/transceiver devices 10 may track shipment unit and vehicle locations in real-time in order to efficiently coordinate delivery activities of different vehicles, such as by allowing for spontaneous platooning at a distribution location or on the road during transit. In some examples, data collected by the receiver/transmitter devices 10 of the present disclosure may also be used to provide evidence-based support for more widespread acceptance of vehicle electrification and/or use of alternate fuels by providing measured information about actual carbon emissions throughout existing supply chains and delivery services.

In some examples, the receiver/transmitter device 10 can be configured to detect acceleration information (e.g., accelerometer snippets) for key events during a journey. As described herein, acceleration information can be used to determine, for example, when a truck accelerates and/or for identifying a type of motive power (e.g. plane, train, automobile, electric truck, or diesel truck). In some examples, determining a type of vehicle being used for transport can be needed in order to determine carbon emissions information for a journey.

In summary, the receiver/transceiver devices 10 disclosed herein integrate with standardized passive RFID tags conventionally positioned on items, which can be used to automate tracking, reducing costs and eliminating manual labor while ensuring precise item-level tracking. These features enable manufacturers and producers to save significantly on logistics costs and production losses by controlling timely shipments, preventing disruptions, optimizing inventory management, and reducing carbon metrics. Furthermore, item-level tracking enhances vehicle utilization, minimizes errors, and reduces shipment spoilage and termination loss, optimizing product distribution and minimizing waste.

A technical challenge addressed by the present disclosure is optimizing reader/RFID performance in cluttered logistics environments with severe electromagnetic difficulties. In particular, the receiver/transmitter device 10 desirably has a range of about 1 meter to 2 meters or more, while being sufficiently compact to accommodate conventional transport platforms (e.g., pallets), containers, vans, or car trunks. Desirably, transmitters of the receiver/transmitter device 10 are also capable of providing seamless operation even when other items obstruct the line of sight. Also, the receiver/transmitter devices 10 attempt to strike a balance between achieving a best possible coverage of passive RFIDs detection in the vicinity of the receiver/transceiver devices 10, while taking into account security concerns for the acquired information. Another challenge addressed by the present disclosure is the determination of how to securely attach the receiver/transceiver device 10 to pallets/containers for extended periods while preventing customer misuse and device damage.

In order to address such challenges, the receiver/transmitter devices 10 disclosed herein use transportation-associated cellular connections with unique system components, which have not previously been integrated or deployed within the types of occluding metal boxes used in logistics, such as metal shipping containers. The receiver/transmitter devices 10 disclosed herein are configured to provide suitable communication even in such challenging environments. In view of such concerns, the present inventor sought to provide a balance between achieving the best possible connection quality and managing power within nanowatt budgets. In particular, the receiver/transmitter devices 10 require a transition from chips designed for daily charging (as provided by current cell phones, air tags, and other active tracking devices) to transport devices requiring extended longevity.

It is believed that the predictive technologies coupled with blink control provided by the receiver/transmitter devices 10 disclosed herein may significantly improve distribution center efficiency, potentially allowing outbound shipments to wait for inbound arrivals or depart sooner, thus increasing trailer fill rates and reducing fuel consumption and product carbon footprint. In some examples, the receiver/transmitter device's 10 context-aware blink rate tracking saves battery by blinking only when relevant to the specific item's journey, providing information about the time of arrival and state of each individual part. In some examples, using the receiver/transmitter device 10 between major manufacturers/supermarkets and their suppliers enables physical warehousing and recyclables to be eliminated, replaced with the reusable packaging of long-sought circular logistics chains and goods that deliver themselves.

According to another aspect of the disclosure, the receiver/transmitter devices 10 and systems disclosed herein can be used for directly measuring carbon emissions or a carbon footprint for shipping activities. This information can be used to establish emissions baselines needed to determine whether changes to existing supply chains meet ambitious reduction targets, as well as for determining total emissions attributable to certain manufacturing or industrial activities (referred to as Scope 3 emissions). Scope 1 emissions (emissions directly attributable to production) and Scope 2 emissions (emissions from purchased energy) are relatively straightforward to measure and analyze. However, determining Scope 3 emissions for a full supply chain can be complex. In order to accurately measure such Scope 3 emissions and to identify options for reducing carbon emissions, manufacturers require accurate measured information from their suppliers and vendors, including from shippers. While some manufacturers are starting to use hybrid carbon accounting methodologies to produce a more accurate assessment of Scope 3 emissions, such methodologies may not consider direct measurements for carbon emissions attributable to shipping. The receiver/transmitter devices 10 of the present disclosure can provide such direct measurements. Furthermore, the carbon emission measuring systems disclosed herein can include digital platforms or centralized systems for providing emissions data, which can be easily integrated into a company's sustainability reporting.

Receiver/Transmitter Devices

Figure 1B:
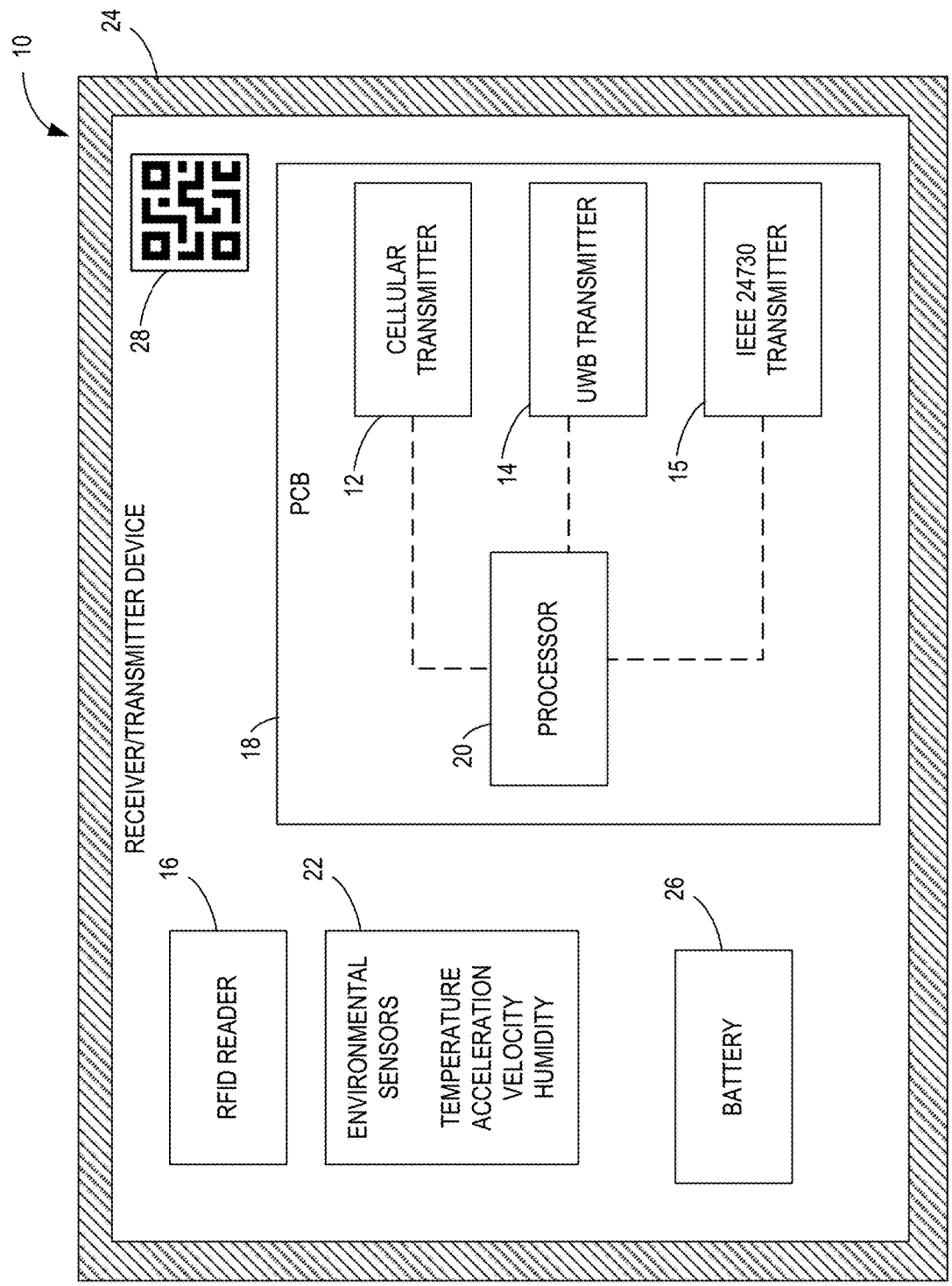

With reference to the figures, a receiver/transmitter device 10 for logistics tracking configured to monitor a shipment unit(s) during a shipping activity comprises communication circuitry including a cellular transmitter 12 for transmission of wireless signals via a cellular network and an ultra-wide band (UWB) transmitter 14 for transmission of radio signals over a short-range network. In some examples, the UWB transmitter 14 can also use BLE and/or WiFi for short-range data communication. In examples, the cellular transmitter 12 can be configured to support one or more of the following cellular communication standards: NB-IoT, LTE-M, CATM. The receiver/transmitter device 10 can also include other transmitter chips or devices for providing legacy or alternative communication capabilities, such as an IEEE 24730 transmitter 15, as shown in FIGS. 1A and 1B.

The receiver/transmitter device 10 further comprises active monitoring or detection circuitry, specifically a radio frequency identification (RFID) reader 16 or detector configured to detect passive RFID tags associated with the shipment unit(s). As described herein, the communication circuitry and/or active monitoring or detection circuitry can be disposed on one or more a printed circuit boards (PCB) 18 (shown in FIG. 1B) and electrically connected together and/or to other components of the receiver/transmitter device 10.

The receiver/transmitter device 10 further comprises a processor 20, such as a general-purpose or specific computer processor or controller, in communication with the communication circuitry and the monitoring or detection circuitry. As described herein, the processor 20 can be configured to selectively cause the cellular transmitter 12, UWB transmitter 14, and/or a WiFi or BLE transmitter to wirelessly transmit information detected by the RFID reader 16 and/or other device sensors, such as environmental sensors 22 (e.g., temperature, vibration, humidity, or acceleration sensors) to a remote computing device 110 or computer server 112 (shown in FIGS. 5A and 6A), such as a central data collection facility, cloud-based database for collecting shipping information, computer network operated by a logistics tracking company or organization, or the Internet.

In some examples, the receiver/transmitter device 10 further comprises a housing 24 enclosing the cellular transmitter 12, UWB transmitter 14, RFID reader 16, processor 20, and other sensors 22, if present. As described herein, the housing 24 can be a secure (e.g., unopenable) enclosure preventing tampering or vandalism and suitable for protecting the electrical circuitry contained therein (e.g., waterproof, puncture-proof, highly visible, capable of being securely mounted to a transport platform, etc.) As described herein, the housing 24 can be sized to be mounted to the transport platform and can include, for example, brackets, fasteners, adhesive pads, and similar fastener mechanism for securing the housing 24 to the transport platform.

a. Detection and Communication Circuitry

As discussed above, the receiver/transceiver device 10 comprises the cellular transmitter 12, UWB transmitter 14, and RFID reader 16 shown in FIGS. 1A and 1B for detecting and transmitting shipment unit information from the receiver/transmitter device 10 to remote sources. In some examples, the cellular transmitter 12 can comprise a cellular chip disposed on the PCB 18. The cellular chip can also comprise other types of wireless transmission circuitry including circuitry for GPS or BLE. In a similar manner, the UWB transmitter 14 can be a chip disposed on the PCB 18 comprising circuitry for emitting and receiving UWB signals. The chip can also include circuitry for other short-range data transmission such as Bluetooth® or WiFi. As discussed above, the receiver/transmitter device 10 can also include other data transmitters 15, such as circuitry for IEEE 24730 communication.

The receiver/transmitter device 10 can be configured to provide passive RFID detecting/reading functionality. This feature is unique compared to current location tracking devices, which offer only cellular connectivity or precision location capabilities. Such conventional devices cannot interact with and/or obtain information from individual shipment units, such as passive-RFID-tagged shipment units within a vicinity of the location tracking devices. By contrast, the receiver/transceiver devices 10 of the present disclosure can detect passive-RFID-tagged shipment units and transmit information about such units to the remote computing devices 110 or servers 112. As previously described, transmitted shipment information can be used to update location databases for the passive-RFID-tagged shipment units, thereby providing location information outside of a shipping facility or warehouse.

Also, unlike cellular tagging alone, the receiver/transceiver devices 10 disclosed herein offer both precision locations within sites (e.g., within shipping facilities with tracking infrastructure) based on signals emitted by the UWB transmitter 14 and periodic data transmissions via the cellular transmitter 12 outside facilities thereby tailoring data transmissions to the geographical relevance of each point in an item's logistics journey and eliminating gaps in the shipping record present using conventional tracking technologies. Furthermore, unlike existing precision real-time location systems, the receiver/transceiver devices 10 disclosed herein do not rely only on infrastructure within premises, thereby avoiding infrastructure-related obstacles, including costs of installing and maintaining such infrastructure. Instead, the receiver/transmitter devices 10 of the present disclosure provide the RFID readers 16, meaning that shipment units can be tagged with affordable stickers (e.g., passive RFID tags), while spreading costs for the receiver/transmitter devices 10 themselves across many journeys using reusable standardized transport platforms, such as pallets or containers. More specifically, in some examples, the receiver/transmitter devices 10 can be deployed on a variety of reusable transport platforms (e.g., pallets, containers, trailers, or vehicle trunks) and are configured for reading passive-RFID tagged items in-transit.

In some examples, the RFID reader 16 is configured to identify, interact with, and/or interrogate an RFID tag (e.g., a chipless RFID tag) meaning that individual items can be tagged, tracked, and associated with particular transport platforms (e.g., pallets, containers, and other units) for shipment unit level insight. The RFID tag can also permit passive temperature sensing. Passive temperature sensing allows for refrigeration controls that descend to a shipment unit or product level, rather than solely provided at the receiver/transmitter device 10 level. RFID can also provide a phase-based holograph, which provides sufficient accuracy to make product specific and trade unit level associations at key staging areas.

In some examples, the receiver/transmitter devices 10 are configured to provide periodic scheduled or unscheduled data transmissions from the receiver/transmitter device 10 to the remote computing device 110 or server 112 via the cellular transmitter 12 and/or UWB transmitter 14. These individual data transmissions (also referred to as message cycles, packets, bursts, or blinks) can include information about shipment unit status and location, which can be added to the remote shipment log or database. In some examples, during scheduled or unscheduled message cycles (blinks), location reads, sensor reads, and passive RFID reads are packed into cellular bursts with locations obtained from one or more location technologies to validate or confirm a location of the receiver/transmitter device. These additional location technologies can include, for example, Wi-Fi sniffing (locally 10-100 m accuracy) or cellular E-911 (globally 100 m accuracy), as well as UWB (10 cm accuracy on premises) or GPS (10 m accuracy) location information when the receiver/transmitter device 10 is attached to an external power source.

In some examples, the receiver/transmitter device 10 can be configured to send information about a shipment unit included in a detected RFID tag (e.g., information detected by the RFID reader 16) only once (e.g., upon initial detection of the RFID tag). After initial detection, the receiver/transmitter device 10 can be configured to transmit a shorter representative tag or confirmation information for the shipment unit, which conveys that the previously identified shipment unit and RFID tag remain aboard, for example, a particular transport platform. In some examples, difference in size between the full RFID tag and the representative information or tag can be considerable. For example, the representative tag or confirmation information may be less than a few bytes, while a full passive RFID tag is closer to 1 kb.

In view of the technical and physical requirements for the communication and monitoring or detection circuitry, in one specific implementation, the receiver/transmitter device 10 comprises the following electrical components and circuitry disposed on a PCB using chips or a System-On-Chip (SOC) design with individual blocks performing different sensing, detecting, and transmitting functions. Specifically, the receiver/transmitter device 10 can comprise: an MCU-Microcontroller that runs an embedded App; a Cellular Tx/Rx (e.g. nRF9160, ST GM02S) cellular transmitter; and a BLE/WiFi T/Rx (nRF52840/5340/54H20) transmitter. The receiver/transmitter device 10 can also include an Ultra-wide Band (UWB) transmitter including an 802.15.4 module (e.g. Qorvo UWM1000/3000 or NXP Trimension SR150/040/100T/NCJ29D5/OL23D0). The receiver/transmitter device 10 can also include an RFID reader, specifically an EPC Gen 2 V/UHF RFID reader (e.g. st25ru3993, Impinj Ex10). The receiver/transmitter device 10 can also include IEEE 24730 for optional legacy "Wherenet" support. The receiver/transmitter device 10 also includes a battery module, which can include: an enclosure for 1-4 AAA or AA and/or a primary alkaline or NiMH, Lithium rechargeable. Optionally, the receiver/transmitter device 10 can also include an energy harvester module comprising a small solar energy converter for stationary recharge and/or a vibration harvester for in motion energy harvesting.

In another specific implementation, the receiver/transmitter device 10 comprises a NB-IoT and CATM Modem from Nordic Semiconductor (nRF9160 with 64 MHz ARM Cortex M33 and 1 MB Flash, 256 KB RAM) for cellular transmission; an Arm TrustZone and Arm CryptoCell on nRF9160 processor; a slot for eUICC (Embedded Universal Integrated Circuit Card) and Nano SIM backup; Global Navigation Satellite System (GNSS) from Qorvo; Bluetooth® Low Energy (BLE) 5.0 from Nordic Semiconductor (nRF52840 with 64 MHZ ARM Cortex M4 and 1 MB Flash, 256 KB RAM); near field communication (NFC) circuitry; additional sensors (e.g., temperature, humidity, air quality accelerometer, and/or piezzo buzzer sensors); a 1250 mAh Re-chargeable Battery; USB-C; 3-color LED; a physical button; 8 MB flash connected to the 9160 via a SPI interface; and/or Debug interface and grove interface for Ardesco development kit. Dimensions of this implementation of the receiver/transmitter device 10 can be about 45×80×12.7 mm.

In another specific implementation, the receiver/transmitter device 10 includes ST Micro AVR-IoT, which includes: AVR128DB48 AVR® Microcontroller; ATECC608B CryptoAuthentication™ Device; GM02S Cellular Module; 824-2170 MHz Cellular Flexible Antenna; VEML3328 Color, MCP9808 Temp Sensors; USB; Battery; and External-Input Power Options.

In another specific implementation, the UWB circuitry or transmitter 14 of the receiver/transmitter device 10 can include a Qorvo® DWM3000EVB UWB module, which allows for both Channel 5 and Channel 9 UWB operation. The module can comprise: Qorvo® DW3110 UWB IC; a ceramic UWB antenna; on board 3V3 DC-DC; and/or 2.54 mm jumper for selection of the power supply and current consumption measurements. All module pins can be accessible on the Arduino connectors. Alternatively, UWB circuitry can comprise the NXP SR150 module.

In other implementations, the RFID circuitry (e.g., the RFID reader 16) of the receiver/transmitter device 10 can comprise an ST25RU3993 RAIN® (UHF) RFID reader device, which provides multi-protocol support for the 840-960 MHz UHF band compatible with ISO18000-62 & -63, ISO29143 and to GS1's EPC UHF Gen2 air interface protocol, includes a MCU-STM32L476RGT6 (Arm® Cortex®-M4). The receiver/transmitter device 10 can also include the MCU, which provides protocol support for ISO 18000-6C (EPC Class1 Gen2); ISO 29143 (Air interface for mobile RFID); and ISO 18000-6A/B through direct mode. The RFID reader device 16 can further comprise or provide: DRM: 250 kHz and 320 kHz filters for M4 and M8; integrated supply regulators; frequency hopping support; ASK or PR-ASK modulation; automatic I/Q selection phase bit for tag tracking with 8-bit linear RSSI; temperature range: –40° C. to 85° C.; 48-pin QFN (7×7×0.9 mm) package; and/or tag read rates of up to 700* tags/s (16-bit tag EPC length). Alternatively, the RFID reader 16 or circuitry can comprise Impinj Ex10—MR20 Evaluation.

The RFID reader 16 or circuitry further comprises an RFID antenna, which can comprise a loop running around inner dimensions of the receiver/transmitter device 10 and pointing a beam outward from the receiver/transmitter device 10. The antenna can be roughly 5 dBi for a receiver/transmitter device 10 with dimensions of 80×130 mm and having a range of about 2 m or more. A port on the receiver/transmitter device 10 may provide access to a larger antenna for fixed installations.

b. Environmental Sensors

As previously described, in some examples, the receiver/transmitter device 10 further comprises environmental sensors 22 (shown in FIG. 1B) for detecting status information for shipment units being tracked and monitored by the receiver/transmitter device 10. For example, the environmental sensors 22 can be configured to monitor environmental factors including temperature, vibration, humidity, air quality, and/or acceleration for determining condition of the shipment unit and device 10.

For example, the receiver/transceiver device 10 can include a motion sensor, such as an accelerometer (e.g., a single axis or multi-axis accelerometer) and/or gyroscope for detecting changes in acceleration and/or direction of the receiver/transmitter device 10 and shipment unit. As described in further detail herein, information detected by accelerometers can be used to determine whether a shipment is in motion and, in some instances, to determine the type of vehicle (e.g., gas powered automobile, electric automobile, truck, train, airplane, or others) based on acceleration signals detected by the accelerometer. In some examples, accelerometer signals can also be monitored to determine when a shipment unit or transport platform with the receiver/transmitter device 10 is mishandled, dropped, or otherwise damaged. In this way, information detected by the accelerometer can be used to determine a likelihood that a shipment is broken and will need to be replaced even before the shipment arrives at a final location.

Other environmental sensors 22 can be used for detecting other conditions that could damage shipment units. For example, for food deliveries, information detected by a temperature or humidity sensor could be used to determine whether food has spoiled and should be discarded. Information from the environmental sensors 22 can also be used to determine location information for shipment units and receiver/transmitter devices 10. For example, a change in temperature may indicate that a shipment unit and receiver/transmitter device 10 have arrived at a shipment facility and are being unloaded from a refrigerated vehicle. In a similar manner, a change in acceleration may indicate that a shipment unit and receiver/transmitter device 10 have been transferred to another vehicle or arrived at an intermediate or final destination.

In some examples, the receiver/transmitter device 10 can also be configured to provide alerts when detected sensor values (e.g. temperature/cold chain specification, shock/vibe damage, light or other exposure or timing disruption) are outside of acceptable or threshold ranges. For example, a shipping system may be configured to provide an alert to a user when a detected temperature exceeds a threshold value.

c. Battery and Power Management Features

With continued reference to FIGS. 1A and 1B, the receiver/transmitter device 10 can comprise an internal rechargeable or single-use (disposable) battery 26 enclosed in the housing 24. For example, the receiver/transmitter device 10 can comprise a non-rechargeable single use variant that lasts at least about 20,000 blinks, such as 4× AA NiMH batteries, which equals 12,000 mAH, or equivalent. Lithium or other low self-discharging batteries can also be used for even longer life. In some examples, the battery 26 can be rechargeable via an external power bank, energy harvester, and/or USB-C port 40 (shown in FIG. 2B). In some examples, the receiver/transmitter device 10 can be configured to budget battery power by radio or transmitter type to maximize data to the customer while minimizing likelihood that the battery 26 will be fully depleted. For example, battery power can be apportioned as follows: cellular 90%, passive RFID reader 9%, UWB 1%. It is noted that while integrated Application-Specific Integrated Circuits (ASICs) supporting short battery recharge cycles (hours/days) exist, the receiver/transmitter device 10 of the present disclosure desirably provides power for long periods of time (e.g., one year or more) without recharging, meaning that such short-battery recharge devices may not be needed or useful.

In some specific examples, battery 26 lifespan for circuitry of components of the implementations of the receiver/transmitter devices 10, as previously described, can be as follows: cellular: ~1,500 cellular blinks/1.3 Ah; 4 AAA provide 4×2.85=11 Ah, which provides about 20,000 blinks; or 2/day for 7 years=5,110 blinks (e.g., roughly lifetime of a pallet). With an external energy harvesting device, the receiver/transmitter device 10 blink rate may be increased >2/day. Using UWB transmissions, the receiver/transmitter device 10 can provide blinks at about 1 blink per second for up to 7 years using a coin cell battery of 200 mAh, meaning that UWB has only a negligible impact on battery life. A conventional passive RFID reader 16 typically scans about 1300+ reads per second for a shift (e.g., a few hours) with a 7000 mAh battery. Reducing reading frequency to about 2000 reads/day would consume around 0.37 mAh, perhaps 10% battery impact compared to cellular.

In some examples, the receiver/transmitter device 10 can be configured with power saving features such as multiple battery modes or operating modes. For example, the receiver/transmitter device 10 can be configured to limit communication when power is provided only by a disposable battery 26 and to communicate more frequently when receiving external power (e.g., power from a separate modular battery, power bank, energy harvester, or another device, such as vehicle main power). In some examples, the receiver/transmitter device 10 can also be configured to power down unused functions during and between blinks to maximize battery life. In some examples, the receiver/transmitter device 10 can also be configured to wake-up or resume data transmission based on environmental factors (e.g., changes in motion or temperature detected by the environmental sensors 22). For example, the receiver/transmitter device 10 may be configured to recognize when a vehicle stops or when a transport platform is removed from a vehicle.

In some examples, the receiver/transmitter device 10 can operate in a low power mode in which communication is limited solely to infrequent cellular blinks. In that case, UWB transmissions seeking to identify a stationary or anchor receiver/transmitter device 10, UWB gateway, and/or for location finding purposes can be turned off to conserve power. In some examples, the receiver/transmitter device 10 can be configured to enter the low power mode automatically, such as when available battery life is below a predetermined or selected threshold. In other examples, a user can be permitted to remotely enable low power mode if, for example, it is determined that frequent communication from the receiver/transmitter device 10 is not needed.

In some examples, another battery saving mechanism can comprise using geo-fencing information to control whether communication via cellular (e.g., transmitter cellular blinks) is needed or preferred. For example, the receiver/transmitter device 10 can be configured to detect geo-fencing signals, such as signals emitted by UWB enabled communication devices in a shipping facility. When the receiver/transmitter device 10 determines that it is located in the facility and in proximity to the UWB enabled communication devices, communication can be exclusively via the UWB transmitter 14 and the cellular transmitter 12 can be turned off. By contrast, when geo-fencing signals are absent, the receiver/transmitter device 10 can be configured for communication solely by periodic cellular blinks and the UWB transmitter 14 can be turned off to conserve power.

In some examples, when scheduled or triggered communication blinks are occurring, the receiver/transmitter device 10 can be configured to reduce power provided to the RFID reader 16 because scanning for RFID tags may be less important than data transmission. For example, the receiver/transmitter device 10 can adjust or reduce RF power emitted by the RFID reader 16 and/or lower a read speed or frequency (e.g., reducing the duty cycle of the RF power using an increased RF off-time parameter). In other examples, the RF power of the RFID reader 16 can be reduced during a journey, because it is likely that contents of a transport platform or pallet will remain intact while a vehicle is in motion.

d. Housing and External Features

Figure 2A:
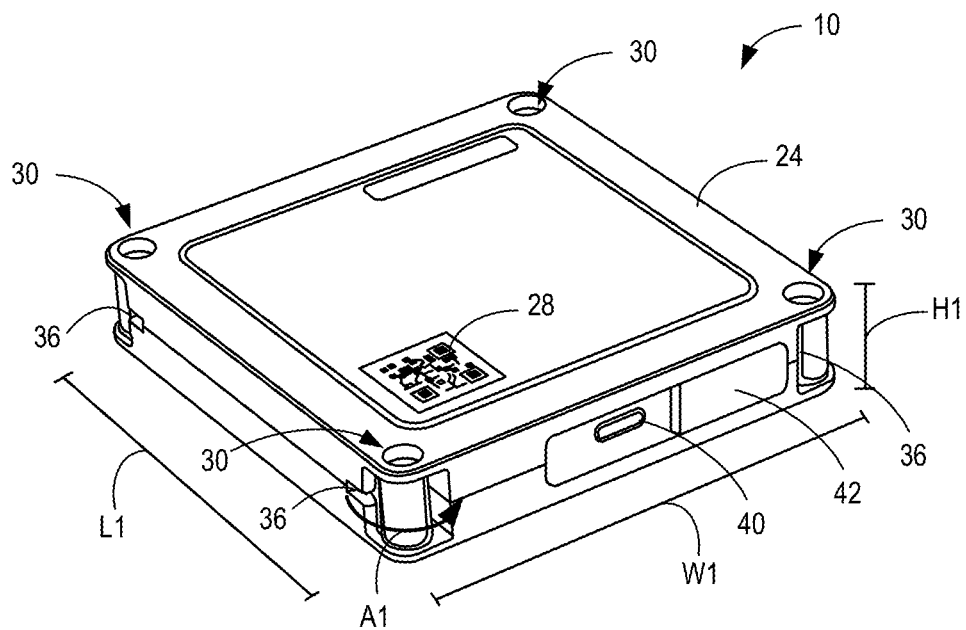
FIGS. 2A and 2B are perspective views showing external housings of receiver/transmitter devices, according to an aspect of the present disclosure.
Figure 2B:
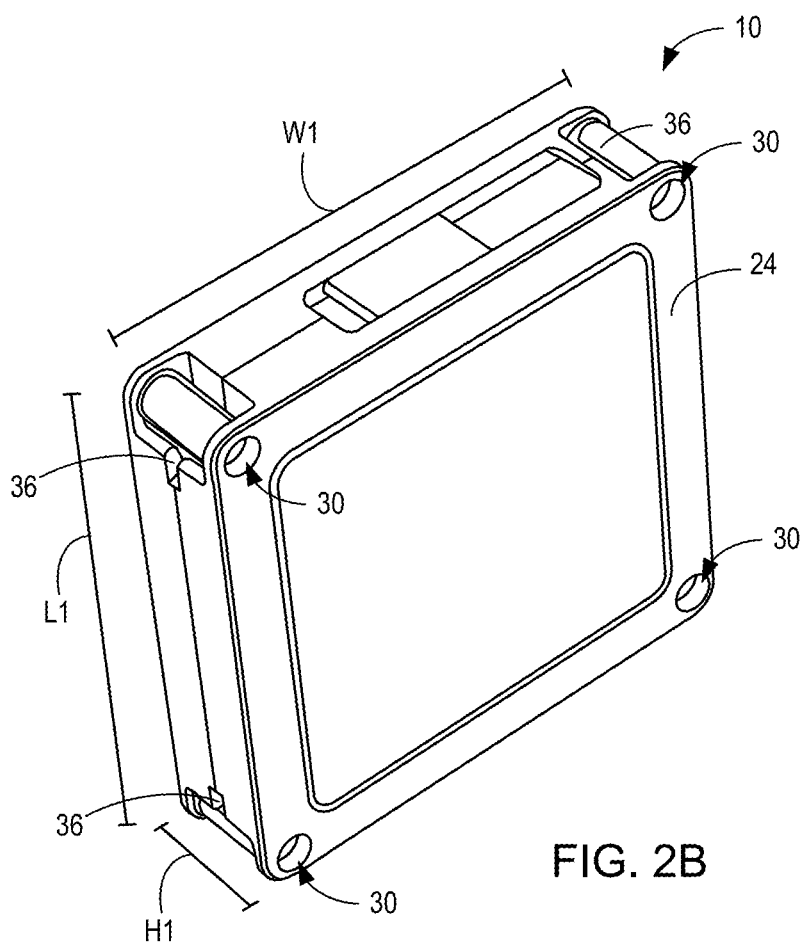

FIGS. 2A and 2B show an exemplary external housing 24 for the receiver/transmitter device 10. The housing 24 is generally rectangular in shape with the following dimensions: a width W1 of about 2 inches to 5 inches; a length L1 of about 4 inches to about 10 inches; and a thickness or height H1 of about 0.5 inch to about 1.0 inch. The housing 24 generally should be sized to easily attach to or fit within a transport platform, such as a pallet. For example, as described in further detail herein, the housing 24 can be sized to fit between horizontal slats of a pallet, which generally have a gap of about 3.0 inches to about 3.5 inches. The housing 24 should also be of a sufficient size to enclose the electronic components of the receiver/transmitter device 10.

In one specific example, the housing 24 of the receiver/transmitter device 10 has dimensions of 3.25 inches×0.625 inches×5 inches and is sized to accommodate only AA batteries with a capacity of about 12 Ah. In another example, the housing 24 can be sized to accommodate four AAA batteries providing 11 Ah, which provides about 20,000 blinks. In other examples, as described herein, external power sources can be provided, such as an energy harvesting (e.g., solar) device or power bank, to provide additional power without increasing the size of the housing 24.

In some examples, the housing 24 of the receiver/transmitter device 10 can be predominantly a high visibility color, such as neon green, orange, or yellow, so that technicians and other workers can easily identify which transport platforms or pallets have receiver/transmitter devices 10 installed on them. Also, besides regulatory labeling, the receiver/transmitter devices 10 can include a unique QR code 28 and passive RFID integration so that a receiver/ transmitter device 10 can be uniquely identified even when the device battery 26 is completely depleted.

In some examples, the housing 24 further comprises structures for fastening or securing the housing 24 to the transport platform. For example, as shown in FIGS. 2A and 2B, the housing 24 includes fastener receivers 30 disposed at the corners of the housing 24. In some examples, the fastener receivers 30 can be threaded screw holes configured to receive fasteners (e.g., screws 32) for securing the receiver/transmitter device 10 to a transport platform. For example, as shown in FIG. 3B, the fastener receivers 30 can receive the screws 32 for securing the receiver/transmitter 10 to slats of a pallet.

In other examples, the fastener receivers 30 can also receive a bracket 34 (shown in FIG. 3B) for securing the receiver/transmitter device 10 next to rather than over a slat of the pallet. The fastener receivers 30 can also include sharpened teeth 36 configured to bite into slats for holding the receiver/transmitter device 10 next to a horizontal slat. For example, the fastener receivers 30 can be rotatable relative to the housing 24, as shown by arrow A1 in FIG. 2A. Rotating the fastener receiver brings the teeth 36 into contact with the wood slats, thereby securing the receiver/transmitter device 10 to the slat. In other examples, as shown in FIG. 2B, the receiver/transmitter device 10 includes an adhesive pad 38 for adhering the receiver/transmitter device to a surface of a slat.

In some examples, the housing 24 includes a USB-C port 40 or connector, which can be used for connecting the receiver/transmitter device 10 to an external device such as a modular battery, power bank, energy harvesting device, or wired computer communication device. In order to ensure that the housing 24 is waterproof and to protect the communication circuitry enclosed in the housing 24, the port 40 can include a cover 42 configured to slide over and seal the port 40.

e. Communication Systems and Protocols

With reference again to FIGS. 1A and 1B, the receiver/transmitter device 10 can comprise embedded software (e.g., software embedded with or installed on the processor 20) including software for reading signals detected by the environmental sensor 22 (accelerometer, temperature sensor, and/or timer signals); for controlling RFID chip read functions of the RFID reader 16; for controlling the UWB transmitter 14; and/or other functions. For example, embedded software can be configured to create the blink messages as scheduled or triggered. The embedded software can also comprise instructions for commissioning the receiver/transmitter device 10 upon initial power-up (e.g., via either Bluetooth® or simply in response to discovering its own location when a cellular network search and/or UWB or WiFi search completes).

As previously described, the receiver/transmitter devices 10 disclosed herein are configured to transmit logistics information (e.g., location and status information for shipment units mounted on or in proximity to the receiver/transmitter device 10) by blink stimulation. Communication protocols that can be employed by the receiver/transmitter devices 10 for blink stimulation will now be described in further detail.

Initially, readings from the environmental sensors 22 (e.g., the accelerometer, temperature sensor, and/or timer) can stimulate creation of a blink and can initiate scanning of passive RFID tags on shipment units by the RFID reader 16. Blink rates and scanning frequencies can be established based upon device status (e.g., battery level), detected events (e.g., changes in temperature or acceleration), or rates that are determined by a geo-fenced location. To support location geo-fencing, signals from remote location information services (E-911, WiFi sniff, or UWB (or 24730)) can be received in response to blinks. Furthermore, RFID readers 16 can read all EPC Gen 2 passive RFIDs within a vicinity, including any temperature sensing tags, to gain information that can be relied upon to establish location of a particular receiver/transmitter device 10. Information obtained from the passive RFIDs can then be packaged into messages that are transferred via a most battery-efficient means available for reaching the cloud (e.g., in order of UWB, WiFi, and cellular). In some examples, when not at a precision locating facility, a UWB/IEEE 24730 blink rate can be reduced to conserve power.

A cloud computer system can be configured to receive blink streams from multiple receiver/transmitter devices 10, thereby providing a large Internet of Things (IoT) real-time database solution. The database solution can support storage of historical information, permitting query based access for senders and receivers. Furthermore, software can be configured to analyze received data in the cloud for implementing alerts and/or identifying needed configuration changes. In some examples, data streams can also be analyzed by artificial intelligence and machine learning processes to provide insight and logistics control. In another example, system software can be configured to provide a database of locations, capture times, and/or status information to enable business logic. The database of locations can provide information to customers, such as an estimated time of arrival, allowing customers to make decisions about, for example, whether a shipment, which has no chance of reaching a customer prior to expiration and/or with an acceptable level of freshness, should be intercepted. The database of locations also allows for sub-element splitting, e.g. pallets can enter a distribution center from one vehicle and be separated at the distribution center in order to leave the distribution center in many different vehicles. Splitting can also be monitored for multiple shipment units within a single transport platform or pallet. The system software can also provide logical determinations of proximity, which can be used, for example, to unlock doors automatically for authorized users and/or when certain shipment units approach a door or gate within the distribution facility. The software can also allow users to back trace from an adverse event to an original source and then forward trace to other destinations so that regulated intercepts can be made, e.g. unhealthy produce intercepted at all related outlets given a single adverse event. In some examples, software can be configured for use as a smart phone App, such as an App configured to be coupled with 802.15.4 UWB locate (e.g. Apple® Air Tags) to support re-usable transport platforms or shipment units in a use anywhere model. In some examples, software can also be configured for use with a Lynk satellite system allowing communications for IoT nodes with the ability to leverage Doppler etc. to create ubiquitous locate across the globe.

f. Operation Modes

The receiver/transmitter devices 10 disclosed herein can be configured to operate in various "operation modes" at different times before, during, and following a shipping event. As previously described, different operation or power saving modes can be used to conserve device power and/or to ensure that the most accurate location determining circuitry is being used when needed and/or available.

During an initial or "template" operation mode, a template schedule is loaded to the receiver/transmitter device 10 for an upcoming journey defining a usage type. The template can be initially set during commissioning and can be updated or modified during transit via, for example, georeference (e.g., based on a remote location determined via cellular/GPS locate or via UWB when within a shipping facility). For example, there may be an opportunity at each cellular/WiFi blink to download a new template profile for the receiver/transmitter device 10. Allowing independent blinking from modules over different radios to save battery, e.g. high UWB blink rate when within a facility/none over the road, regular cellular blinking over road but hibernation at a facility and/or when motion ceases, conserves battery life.

During a "sensor" operation mode, an accelerometer wake-up signal detected by the environmental sensor 22 can reset blink mode(s) back to a higher rate from hibernation (e.g., hibernating with a settable blink rate of 1/day, 1/week, 1/month, 1/quarter, or 1/year). Passive RFID reads by the RFID reader 16 can be similarly controlled to occur with cellular blinks or more frequently supporting shipment unit temperature sensing ~1/hour. Passive RFID reads may also be triggered by temperature excursion or accelerometer shock events. In particular, all proximate RFIDs can be reported through cellular blink enabling cross-pallet functionality that mitigates on pallet occlusion.

During a "power" operation mode, all blink rates can be increased when power is harvested (e.g., by a solar or vibration energy harvesting device) or available from vehicle or mains power sources. If mains power is available, the receiver/transmitter device 10 can also be configured to operate as a UWB/IEEE 24730 anchor device. As previously described, anchor devices can be distributed throughout a facility and used to detect and monitor more mobile receiver/transmitter devices 10 in order to provide precision location detection for the mobile receiver/transmitter devices 10.

In other examples, the receiver/transmitter device 10 can be configured to control blink rate based on information about a scheduled journey stored on the device processor 20 and/or available from an external device or network (e.g. the cloud). For example, the processor 20 can be configured to cause the receiver/transmitter device 10 to gradually reduce blink intervals at times when shipment unit status is unlikely to change (e.g., when a shipment unit is safely stored in a moving vehicle). Additionally, the receiver/transmitter device 10 can be configured to limit blinks when multiple receiver/transmitter devices 10 are traveling together (e.g., in the same trailer or in close proximity to one another in a large facility). In such cases, frequent updates on shipment unit status from multiple receiver/transmitter devices 10 located close together may not be needed because any changes or events identified by one receiver/transmitter device 10 likely also effect the proximate receiver/transmitter devices 10.

External Power Banks and Energy Harvesting Devices

Figure 3A:
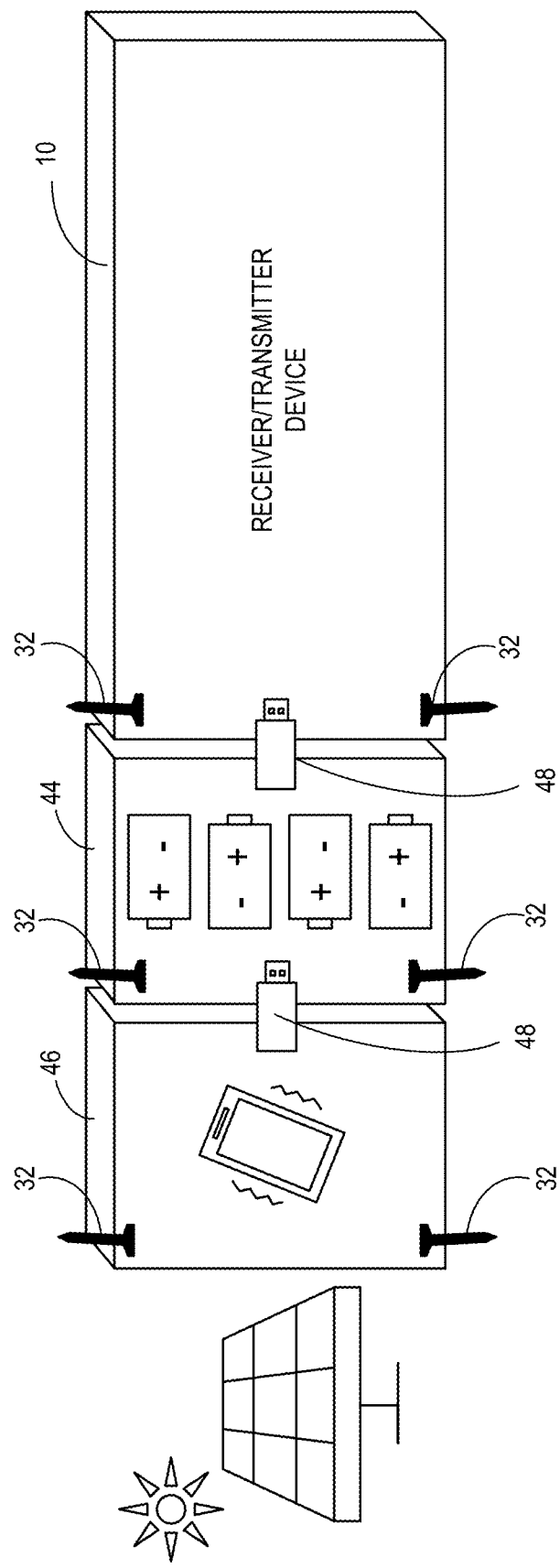
FIG. 3A is a schematic drawing of a receiver/transmitter device including a power bank and energy harvester, according to an aspect of the present disclosure.
Figure 3B:
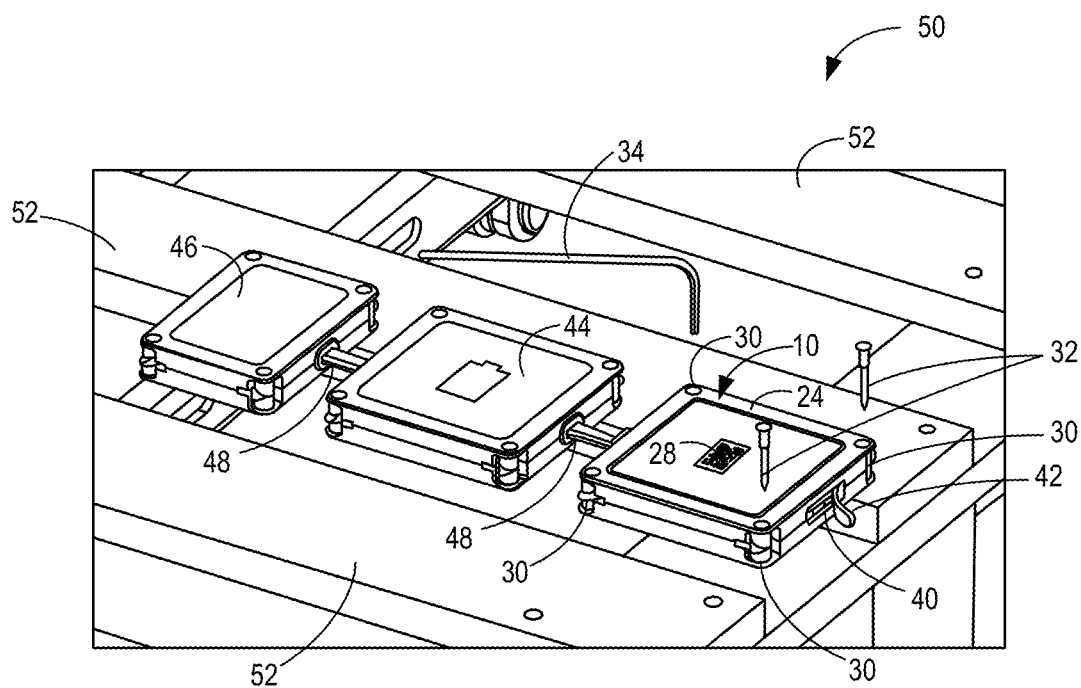
FIGS. 3B and 3C are perspective views showing a receiver/transmitter device including a power bank and energy harvester mounted to a transport platform, such as a pallet, according to an aspect of the disclosure.
Figure 3C:
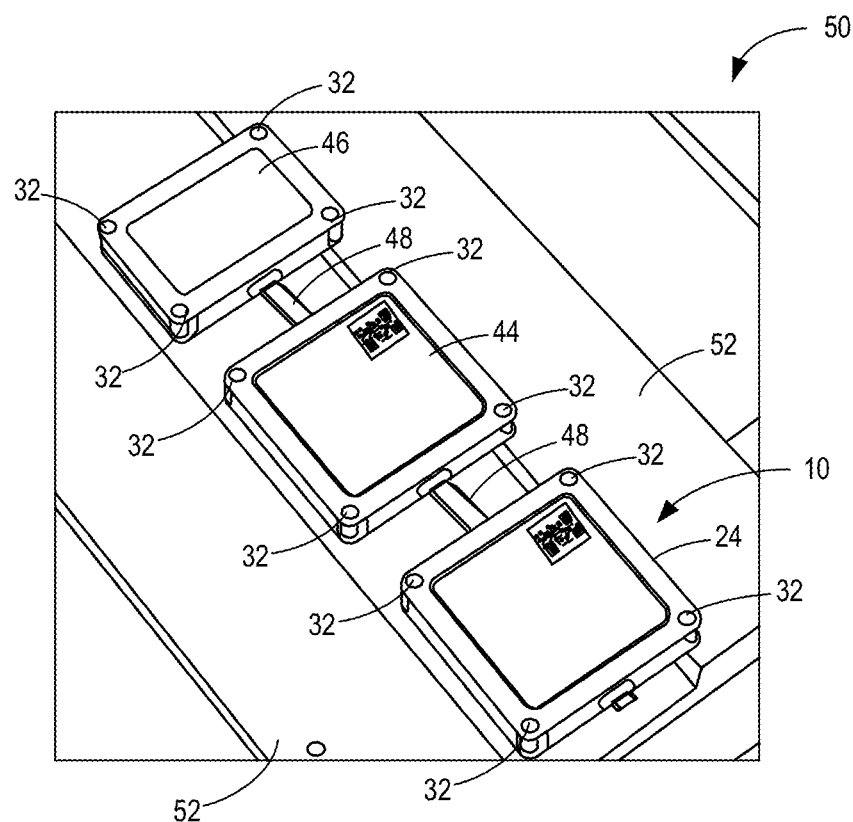

FIG. 3A is a schematic drawing showing a receiver/transmitter device 10 connected to an external power bank 44 and energy harvesting device 46. FIGS. 3B and 3C show the receiver/transmitter device 10, power bank 44, and energy harvesting device 46 connected to a transport platform, such as a pallet 50 comprising horizontal slats 52 for supporting shipping units.

As previously described, the power bank 44 can be a rechargeable battery source or battery module that provides additional power for the receiver/transmitter device 10 allowing the receiver/transmitter device 10 to operate for a longer duration (e.g., for a number of years and/or for an entire lifespan of a pallet 50) and/or to transmit data and higher blink rates than when using only disposable or rechargeable batteries 26 enclosed within the device housing 24. The power bank 44 can be enclosed in a housing of similar dimensions to the housing 24 of the receiver/transmitter device 10. In particular, the power bank 44 can be dimensioned to fit between the slats 52 of a transport platform or pallet 50. As shown in FIG. 3A, the power bank 44 can be mounted to the transport platform or pallet 50 by fasteners 32 or screws in a manner similar to the receiver/transmitter device 10. As shown in FIG. 3A, the power bank 44 can be connected to the receiver/transmitter device 10 by an electrical cable 48 (e.g., a USB cable) extending from the power bank 44 to the port 40 of the receiver/transmitter device 10.

The energy harvesting device 46 can also be a separate device connected to the power bank 44 and/or receiver/transmitter device 10 by cables 48 or by a wireless connection. In some examples, the energy harvesting device 46 comprises a solar device with solar panels configured to convert sunlight to electrical current for powering the receiver/transmitter device 10. In other examples, the energy harvesting device 46 can be a vibration device including electrical components configured to convert vibratory motion, as may occur while the device 46 is being transported in a moving vehicle, to electrical current. As with the power bank 44, the energy harvesting device 46 can be connected to the receiver/transmitter device 10 by the cables 48. In other examples, power can be transmitted by a wireless connection. Also, the energy harvesting device 46 can be enclosed within a housing, similar to the housings of the receiver/transmitter device 10 and power bank 44. In some examples, the energy harvesting device 46 can be sized to fit between the slats 52 of the transport platform or pallet 50 and secured to the pallet 50 by fasteners 32 or screws.

Transport Platforms

Figure 4B:
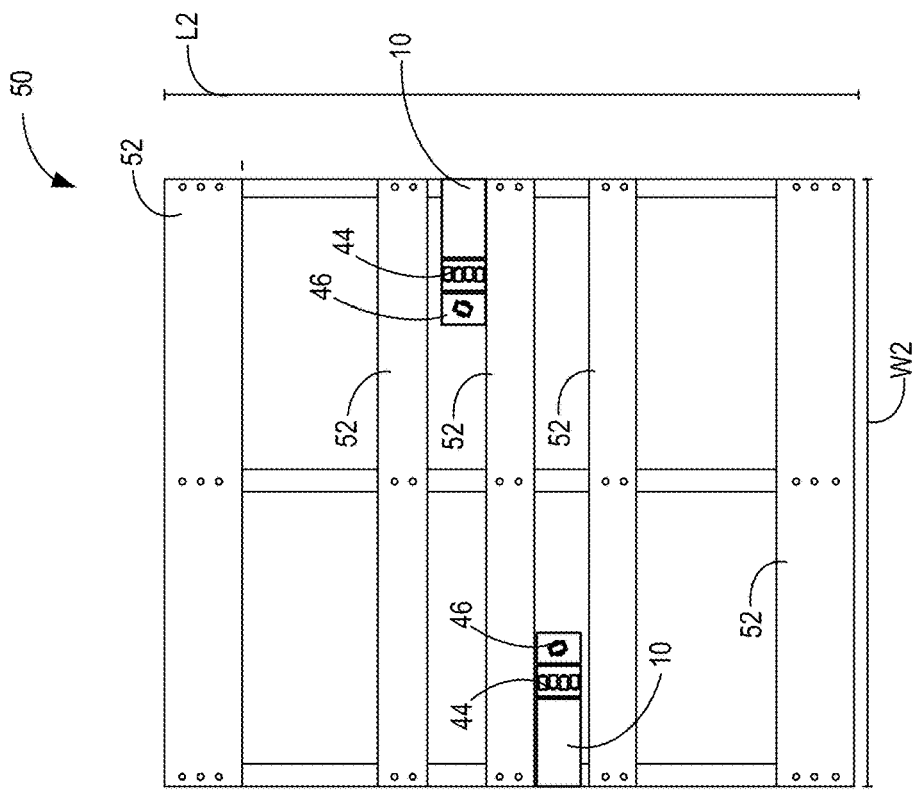
FIGS. 4A and 4B are top views of the receiver/transmitter device and pallet of FIGS. 3B and 3C.
Figure 4A:
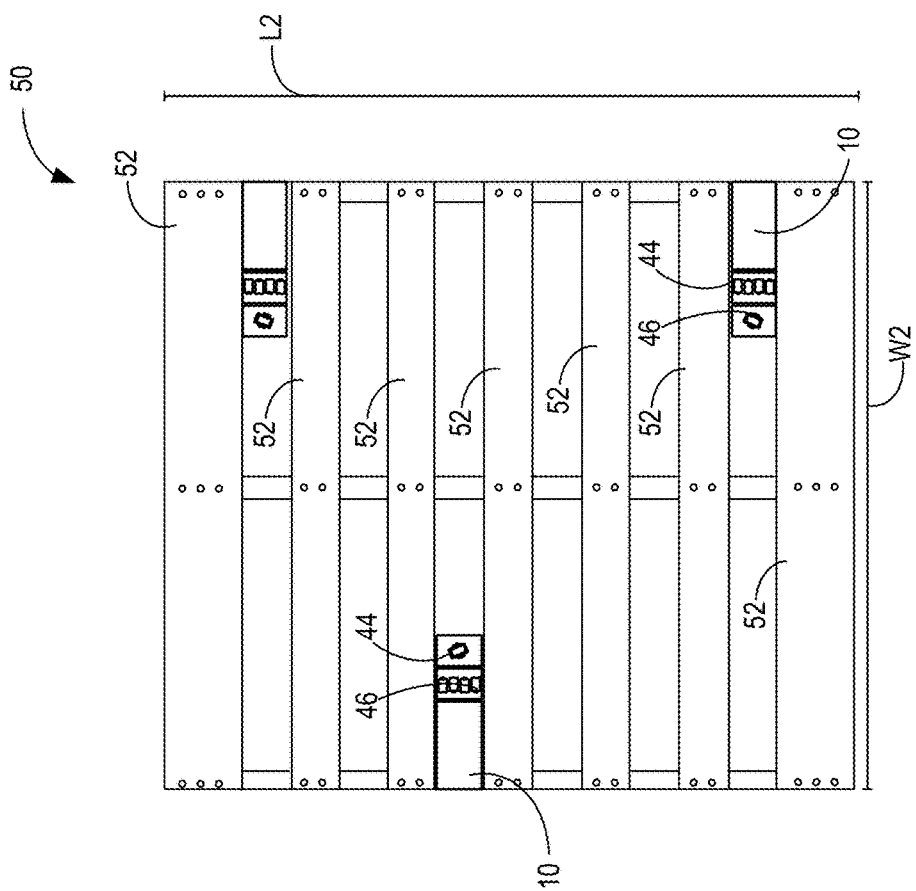

With reference to FIGS. 4A-4D, as previously described, the receiver/transmitter devices 10 can be mounted to or integral with a transport platform, such as a shipping pallet 50, container, packaging, or another enclosure. Pallets 50 are available in a range of standard sizes or dimensions. The receiver/transmitter devices 10 disclosed herein are configured to attach to standard pallets 50 of various sizes in different positions or configurations. For example, as shown in FIGS. 4A and 4B, the receiver/transmitter device 10 can be dimensioned to fit within a gap between elongated members or slats 52 of the standard pallets 50, though in some cases a gap may be wider than the receiver/transmitter device 10. It is also understood that dimensions of the receiver/transmitter devices 10 disclosed herein can be modified be those skilled in the art for use with different types of pallets 50 and/or different shipping containers or enclosures. Further, in most cases, it is expected that receiver/transmitter devices 10 disclosed herein will be provided to end users prior to attachment to any shipping container or pallet 50. The end user can install the receiver/transmitter devices 10 on their own pallets 50 or other shipping containers in any desirable position or configuration. Thus, in most cases, the receiver/transmitter devices 10 disclosed herein are provided as a stand-alone device 10 that can be used with a range of standard pallet sizes, and which can be installed in different positions on the pallets 50 depending upon specific needs and use requirements of different end users.

In some examples, as shown in FIGS. 4A and 4B, the receiver/transmitter device 10 can be attached within the gaps in the standard pallets (gaps can have dimensions of 3.25-3.92 inches×0.625 inches×Length). In order to fit within gaps of a pallet 50, as previously described, the receiver/transmitter device 10 can have dimensions of 3.25 inches by 0.625 inch. A length of the receiver/transmitter device 10 can be variable. Furthermore, modular batteries or power banks 44 and/or energy harvesting devices 46 can extend into middle of the pallet 50, which may facilitate replacing a device battery or defective energy harvest circuitry.

Figure 4C:
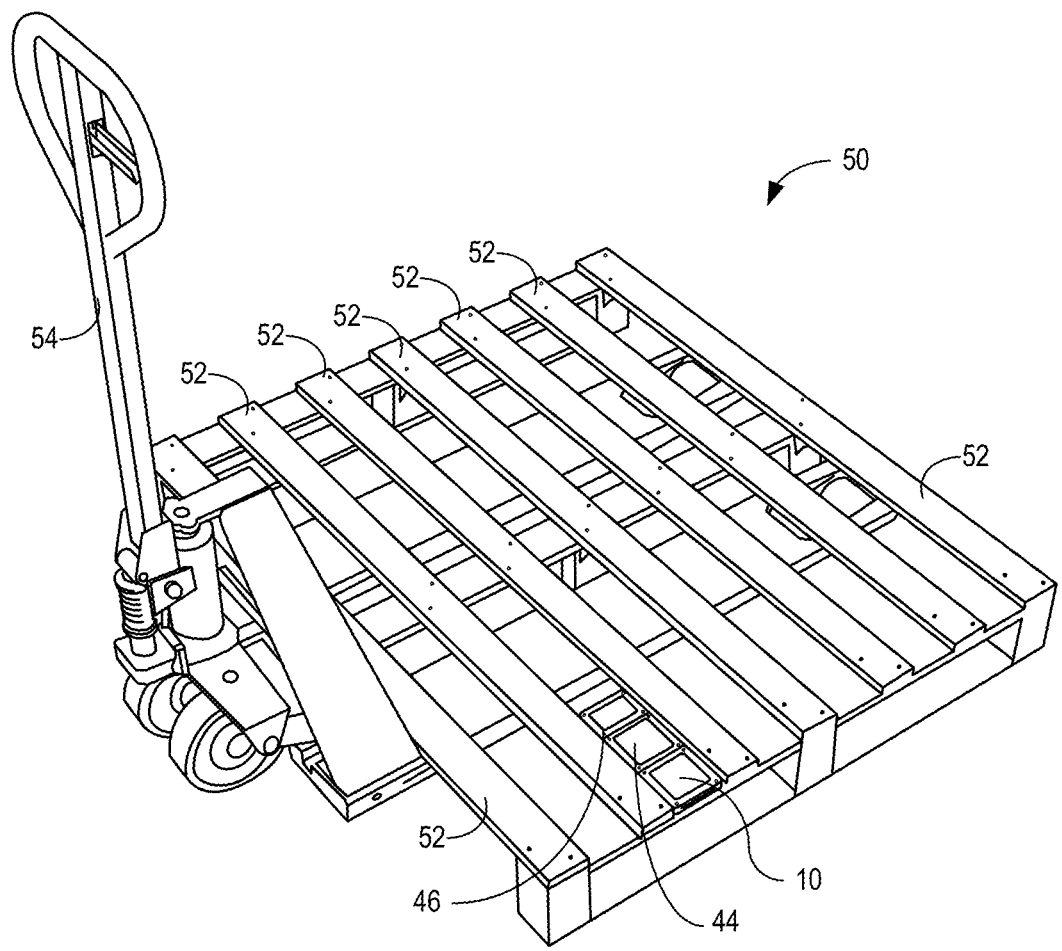
FIG. 4C is a perspective of the pallet of FIGS. 4A and 4B and a motorized dolly for moving the pallet.

In some examples, as shown in FIGS. 4A-4C, the receiver/transmitter devices 10 can be attached to slats 52 of the pallet 50 by fasteners 30 (e.g., by one or multiple screws, nails, brackets 34, or other connectors). In other examples, as previously described, the receiver/transmitter device 10 can be attached to the slats 52 by the adhesive pad 38 or using a magnetic plate on a rear side of the receiver/transmitter device 10.

Examples of pallets 50 that can be used with the receiver/transmitter devices 10 of the present disclosure are shown in FIGS. 4A-4C. In particular, FIG. 4A shows a top view of a standard pallet 50 including seven horizontal slats 52. The pallet 50 has a width W2 of 40 inches and a length L2 of 48 inches. The top and bottom slats 52 are 5.5 inches wide and middle slats 52 are 3.5 inches wide. The gap between the slats 52 is 3.25 inches. There are three receiver/transmitter devices 10 positioned in the gaps, which are sized to fit snugly between slats 52, contacting edges of slats 52 on both sides of the receiver/transmitter device 10. Also, each receiver/transmitter device 10 is connected to a power bank 44 and an energy harvesting device 46.

FIG. 4B shows another example of a pallet 50 with a width W2 of 40 inches and a length L2 of 48 inches. The pallet 50 has five slats 52. The pallet 50 includes two receiver/transmitter devices 10 positioned in gaps between the slats 52. Also, each receiver/transmitter device 10 is connected to a power bank 44 and energy harvesting device 46.

The pallets 50 can be standard pallets used in warehouses and shipping facilities worldwide. As such, pallets 50 including receiver/transmitter devices 10 can be moved through warehouses and shipping facilities using standard vehicles and movement infrastructure. For example, as shown in FIG. 4C, a pallet 50 with a receiver/transmitter device 10 can be moved using a conventional dolly or forklift 54.

There are many examples of different types of conventional pallets 50, which can be used with the receiver/transmitter devices 10 of the present disclosure. For example, stringer pallets, block pallets, solid deck pallets, double face pallets, or double wing pallets, as are known in the art, can all be used with the receiver/transmitter devices 10 of the present disclosure. A stringer pallet refers to a type of pallet 50 with boards known as "stringers" that run between the top and bottom deck boards to add increased load support. These pallets 50 can come in either a "two-way" or "four-way" design. Two-way pallets 50 allow for forklifts 54 to enter from two sides and are sometimes referred to as "unnotched." Four-way pallets 50 allow forklifts 54 to enter the pallet 50 from any side.

A block pallet 50 refers to a four-way pallet that uses cylindrical posts to stabilize the top deck. These pallets 50 can vary significantly in size and configuration. In particular, models are available either with or without top or bottom boards. A solid deck pallet 50 has a single solid sheet of wood with no spaces on its top surface, instead of a series of planks. These pallets 50 are easy to clean and transport. They are particularly useful for transporting and storing small items that could slip between the boards on a more standard pallet 50.

Double face pallets 50 have decks on both the top and bottom of the pallet 50. The addition of a bottom deck strengthens the pallet 50 by more evenly distributing the weight of its load. These pallets 50 come in both reversible and non-reversible models. Reversible models can hold a load on either side. To tell the difference between a reversible and non-reversible pallet 50, check the density of the board placement on each side. Non-reversible pallets 50 are configured to hold a load on only one side. Finally, double wing pallets 50 have top and bottom deck boards that extend beyond the stringers, giving the appearance of "wings" when looking at the pallet 50 directly.

The pallets 50 shown in FIGS. 4A-4C are provided as an example of a standard pallet 50 currently in use, which can be used with the receiver/transmitter devices 10. However, the receiver/transmitter devices 10 can be sized to accommodate and/or fit within gaps for any pallet types described above.

Figure 4D:
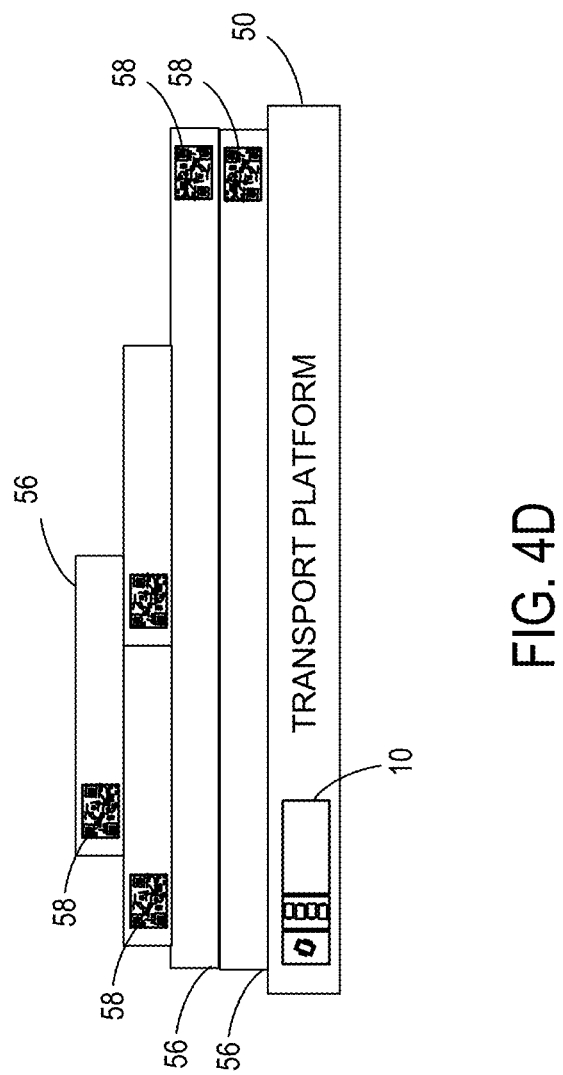
FIG. 4D is a schematic drawing of a transport platform supporting multiple shipping units, according to an aspect of the present disclosure.

With reference to FIG. 4D, the pallets 50 or containers including the receiver/transmitter devices 10 can be used for tracking individual shipment units 56 positioned on or in proximity to the pallet 50 and receiver/transmitter devices 10. In particular, as previously described, each shipment unit 56 can be tagged with a passive RFID tag 58 or chipless RFID. As discussed above, the RFID reader 16 of the receiver/transmitter device(s) 10 on the pallet 50 can be configured to detect the passive RFID tags 58 for the shipment units 56 on the pallet 50, extract information about the shipment unit from the RFID tag 58, and record location information for the shipment units 56 associated with the detected RFID tags 58. In some examples, as previously described, chipless RFID tags 58 can also provide some status information (e.g., temperature information) for individual shipment units 56, thereby providing even more relevant information about individual shipment units 56 during a journey.

In some examples, the receiver/transmitter devices 10 and pallets 50 can be used as components of a "smart pallet" concept or tracking service for providing real-time tracking for individual shipment units 56 via reusable rented or leased smart pallet devices. As in previous examples, a smart pallet 50 can comprise a receiver/transmitter device 10 along with chipless RFIDs and chipped temperature sensing RFIDs attached to or in proximity to individual shipment units 56. The receiver/transmitter devices 10 can be configured to periodically obtain information about individual shipment units 56 by detecting or interrogating the RFID tags 58 and/or chipless RFIDs associated with particular shipment units 56. Beneficially, as previously described, smart pallets 50 allow users to split pallets or move shipment units 56 between pallets 50 during a journey because each smart pallet 50 includes a receiver/transmitter device 10 capable of detecting individual shipment units 56. Therefore, a current location for a particular shipment unit 56 can be determined based on which receiver/transmitter devices 10 detects the particular unit 56 as it moves in and out of distribution. The smart pallet 50 can also be returned or reused by any user similar to reusable propane tanks and can be collected from endpoints and distributed back to circulation via gig workers. In some examples, producers using smart pallets 50 will know when a shipment unit 56 is removed from a particular pallet 50 even in a store, which can be a proxy for sales.

Logistics Tracking Systems and Methods

Figure 5A:
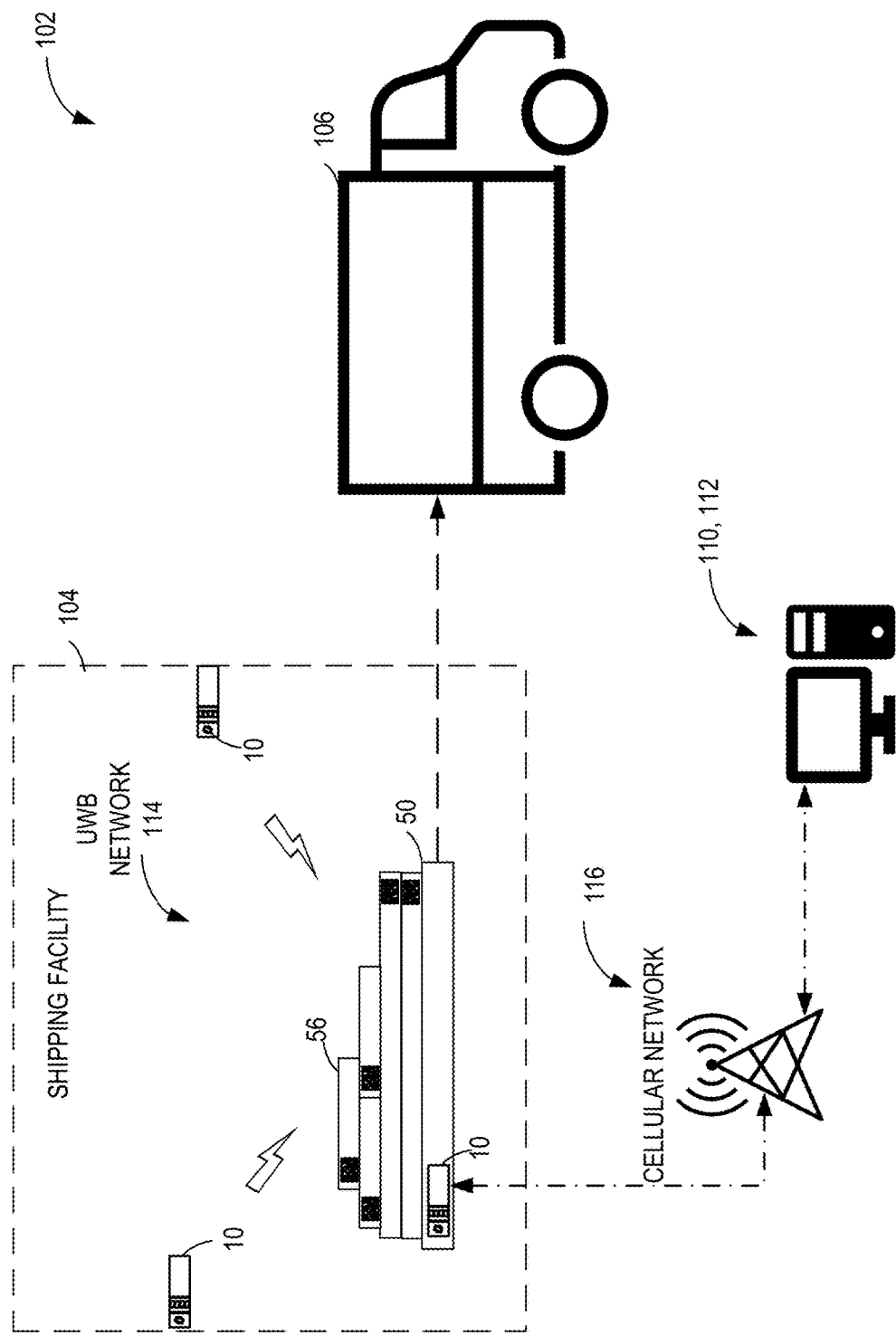
FIG. 5A is a schematic drawing of a shipping system including receiver/transmitter devices mounted to transport platforms, such as pallets, according to an aspect of the present disclosure.

FIG. 5A is a schematic draw of a logistics tracking system 102 including features of the present disclosure. The logistics tracking system 102 can be configured to monitor location and status information for shipment units 56 on a transport platform, such as a pallet 50, as the pallet 50 moves from a shipment facility 104 to a vehicle 106.

As shown in FIG. 5A, the system 102 comprises the transport platform or pallets 50, which includes the receiver/transmitter devices 10 as previously described. The system 102 also comprises a remote computing device 110 and computer server 112 configured to communicate with and receive location and status information for shipment units 56 from the receiver/transmitter devices 10. For example, when in the shipment facility 104, the UWB transmitter 14 (shown in FIGS. 1A and 1B) of the receiver/transmitter devices 10 can be configured to communicate with a UWB network 114 including anchored receiver/transmitter devices 10, as well as UWB gateways, readers, and/or detectors installed throughout the shipment facility 104. When the shipment units 56 and receiver/transmitter devices 10 are outside of the facility 104, such as when being transported in the vehicle 106, the cellular transmitter 12 of the receiver/transmitter devices 10 can communicate with the remote computing device 110 and computer server 112 via a cellular network 116.

Figure 5B:
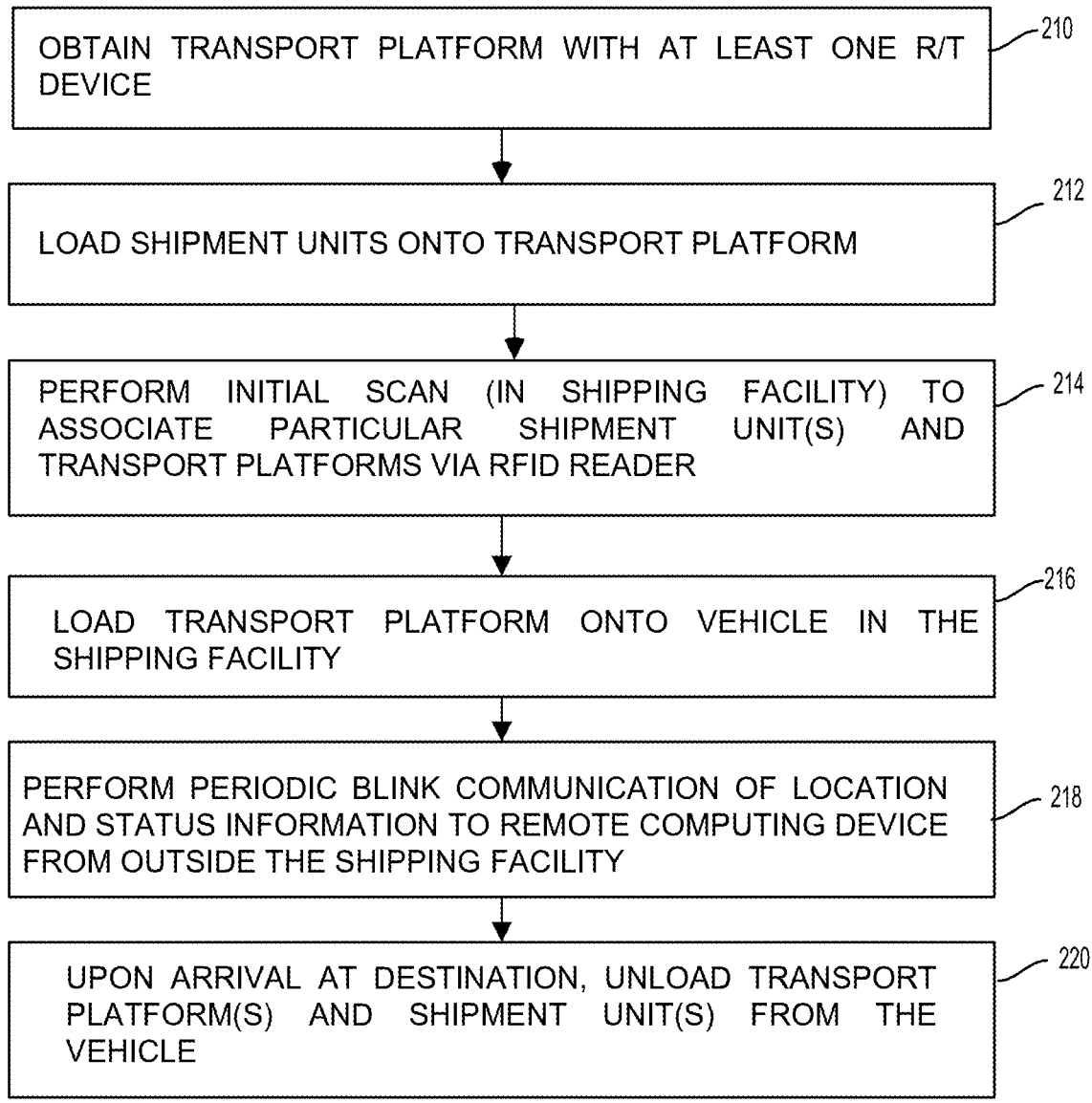
FIG. 5B is a flowchart showing a method for tracking shipment units using a shipping system including receiver/transmitter devices, according to an aspect of the present disclosure.

FIG. 5B is a flowchart showing a method for tracking shipment units 56 using the logistics tracking system 102 shown in FIG. 5A. At step 210, the method can initially include obtaining a pallet 50 including the receiver/transmitter device 10. In particular, as previously described, the receiver/transmitter device(s) 10 can be attached to the pallet 50 via semi-permanent mechanisms (e.g., screws, teeth that rotate from the receiver/transceiver device 10 to bite into the pallet 50, magnets, and/or adhesive tape). Once attached, the receiver/transceiver device 10 can be commissioned by, for example, connecting the device 10 to a power source (such as a modular and/or separable battery pack or power bank 44). Once attached to the power bank 44, the receiver/transmitter device 10 can be configured to establish a communication mode and blink rate for data transmission to the remote computing device 110 or server 112 (e.g., the cloud). In an initial communication, the receiver/transmitter device 10 can provide its own location and condition/state to the remote computing device 110 or server 112. The receiver/transmitter device 10 can then begin to blink at the selected rate determined, for example, based on a type of transmitter available or being used to transmit data. At each blink, the receiver/transmitter device 10 can provide information about RFIDs of proximate passive-RFID tagged items (e.g., a product to be shipped via the pallet/container) in a vicinity of the receiver/transmitter device 10. The blinks can be provided via UWB when available or by cellular when UWB communication is not available. In this way, the receiver/transmitter device monitors passive RFID tagged items on the pallet 50, while also identifying any new items added to the pallet 50 over time. In some examples, this functionality allows associations to be made between locations of the passive-RFID tagged items and the location of the receiver/transmitter device 10 at scheduled or event/sensor alert-based points during a journey.

At step 212, once the pallet 50 and receiver/transmitter device 10 are commissioned for used, the method can include loading one or more shipment units 56 onto the pallet 50, as shown in FIG. 4D. For example, shipment units 56 can be moved onto pallets 50 using forklifts 54, cranes, and other warehouse vehicles, as known in the art, for safely moving loaded pallets 50 through a shipment facility 104. At step 214, once the pallet 50 is loaded with shipment units 56, the receiver/transmitter device 10 can perform an initial scan to associate particular shipment units 56 and pallets 50. For example, the RFID reader 16 of a receiver/transmitter device 10 on a particular pallet 50 can detect passive RFID tags 58 for the shipment units 56 on the pallet 50. If the pallet 50 is located in a shipment facility 104 the information about shipment units 56 can be transmitted to a shipping database on the remote computing device 110 or computer server 112 by the UWB network 114. In some examples, a template for a particular journey can also be downloaded (e.g., from the computer server 112 on the cloud) to an individual receiver/transmitter device 10 so that journey progress for a particular shipment unit can be tracked by the receiver/transmitter device 10. Also, during this initial commissioning stage, a manifest of shipment items 56 being shipped together on a pallet 50 can be automatically generated avoiding the labor intensive and cumbersome process of manually creating and checking a manifest or shipping log. For example, the system 102 can be configured to automatically create a list of items (e.g., shipment units 56) as the individual shipment units 56 are loaded onto the pallets 50 using the passive-RFID technology of the receiver/transmitter device 10. This automated manifest creation functionality increases efficiency and ensures the safety of customer belongings during transit while significantly reducing packing time and cost.

At step 216, the pallet 50 can be loaded onto the vehicle 106 in the shipment facility 104 in preparation for a journey. In some examples, receive/transmitter devices 10 can communicate with vehicle systems to confirm that a pallet 50 and associated shipment units 56 are loaded on a correct vehicle 106 scheduled to go to a correct location. Also, as previously described, the receiver/transmitter devices 10 for pallets 50 in the vehicle 106 can communicate with and/or automatically open doors or gates in the shipment facility 104 via the UWB network 114 as the vehicle 106 moves through the shipping facility.

Once the vehicle 106 departs from the shipment facility 104, at step 218, the method can further include periodically communicating location and status information from receiver/transmitter devices 10 to the remote computing device 110 and computer server 112, as the vehicle 106 is in transmit. Location information can be received by a remote computing device 110 or computer server 112 (e.g., the cloud) and relied upon to update the database of location/status data for the shipment units 56. In some examples, the communicated location and status information can include information from RFID tags 58 on individual shipment units 56 detected by the RFID reader 16 of the receiver/transmitter device 10 in order to provide individual item level feedback about a journey. As previously described, the receiver/transmitter devices 10 can be configured to emit periodic communications or blinks with location and status information. The communications or blinks can be scheduled (e.g., occurring every 10 minutes, hour, or several times per day) or triggered in response to changes (e.g., changes in acceleration or temperature) detected by environmental sensors 22 of the receiver/transmitter devices 10. In some examples, the communications or blinks are transmitted by the cellular transmitter 12 of the receiver/transmitter device 10 over the cellular network 116. Alternatively, if UWB communication is available, data can be transmitted by the UWB transmitter 14 to conserve power. As previously described, the shipping information database on the remote computing device 110 or computer server 112 can be updated with location and status information for individual shipment units 56 based on the information received by the communications or blinks.

At step 220, upon arrival at a final delivery destination, the pallet 50 and shipment units 56 contained thereon can be unloaded from the vehicle 106. In some examples, unloading activity can be detected by environmental sensors 22 (e.g., accelerometers) on the receiver/transmitter devices 10, which may be configured to detect changes in movement or acceleration. The detected changes can trigger communication from the receiver/transmitter devices 10 to the remote computing device 110 or computer server 112. For example, location and status information for shipment units 56 can be sent to the remote computing device 110 or server 112 in order to confirm (e.g., provide a proof of delivery) that a shipment unit 56 arrived at a final destination and that a journey has been completed.

Logistics Tracking Systems and Methods for Vehicles

As previously described, in some examples, the receiver/transmitter devices 10 can be mounted or deployed in a vehicle 106, such as in a trunk of an automobile or in another enclosed container or space within the vehicle 106, to detect and monitor shipment units 56 contained in the trunk or enclosure. Including receiver/transceiver devices 10 in vehicles 106 used by gig-economy workers, such as food delivery drivers, may be especially useful for improving food delivery efficiency and for confirming quality of delivered food items. For example, information provided by the receiver/transceiver devices 10 can be used to coordinate deliveries, enabling platooning, and reducing instances when a driver travels a long distance for a single delivery or for a small number of deliveries. Information collected by the receiver/transceiver devices 10 can also be used for confirming that food is delivered at a correct temperature and in good condition, allowing producers to make price adjustments to account for unexpected or unacceptable delays or changes to food quality.

Figure 6A:
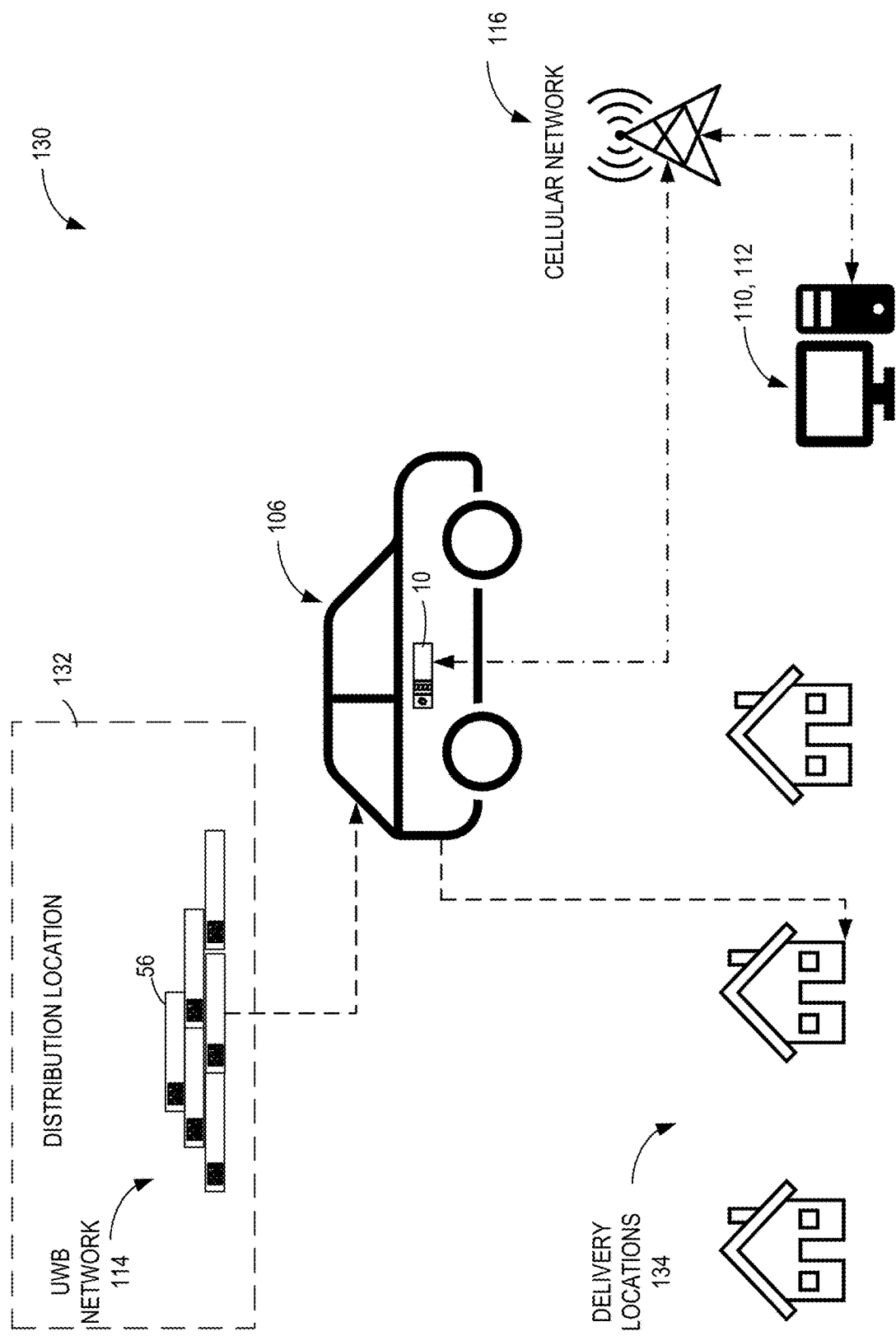
FIG. 6A is a schematic drawing of another example of a shipping system including receiver/transmitter devices mounted to a vehicle according to an aspect of the present disclosure.

FIG. 6A is a schematic drawing of a food delivery system 130 for delivering shipment units 56, such as food items, from a distribution location 132, such as a restaurant, grocery store, market, or similar provider of prepared foods or groceries, to one or more delivery locations 134, such as private homes or businesses. The system 130 comprises a vehicle 106 with a receiver/transceiver device 10 in the trunk of the vehicle 106 for detecting and monitoring the shipment units 56, such as take-away or prepared food items. As in previous examples, the system 130 also comprises a remote computing device 110 and computer server 112 configured to communicate with and receive location and status information for shipment units 56 from the receiver/transmitter device 10. Communication from the receiver/transmitter device 10 to the remote computing device 110 and server 112 can be by the UWB transmitter 14 when available or by the cellular transmitter 12 over a cellular network 116 when the receiver/transmitter device 10 is not within proximity of a suitable UWB network 114.

Figure 6B:
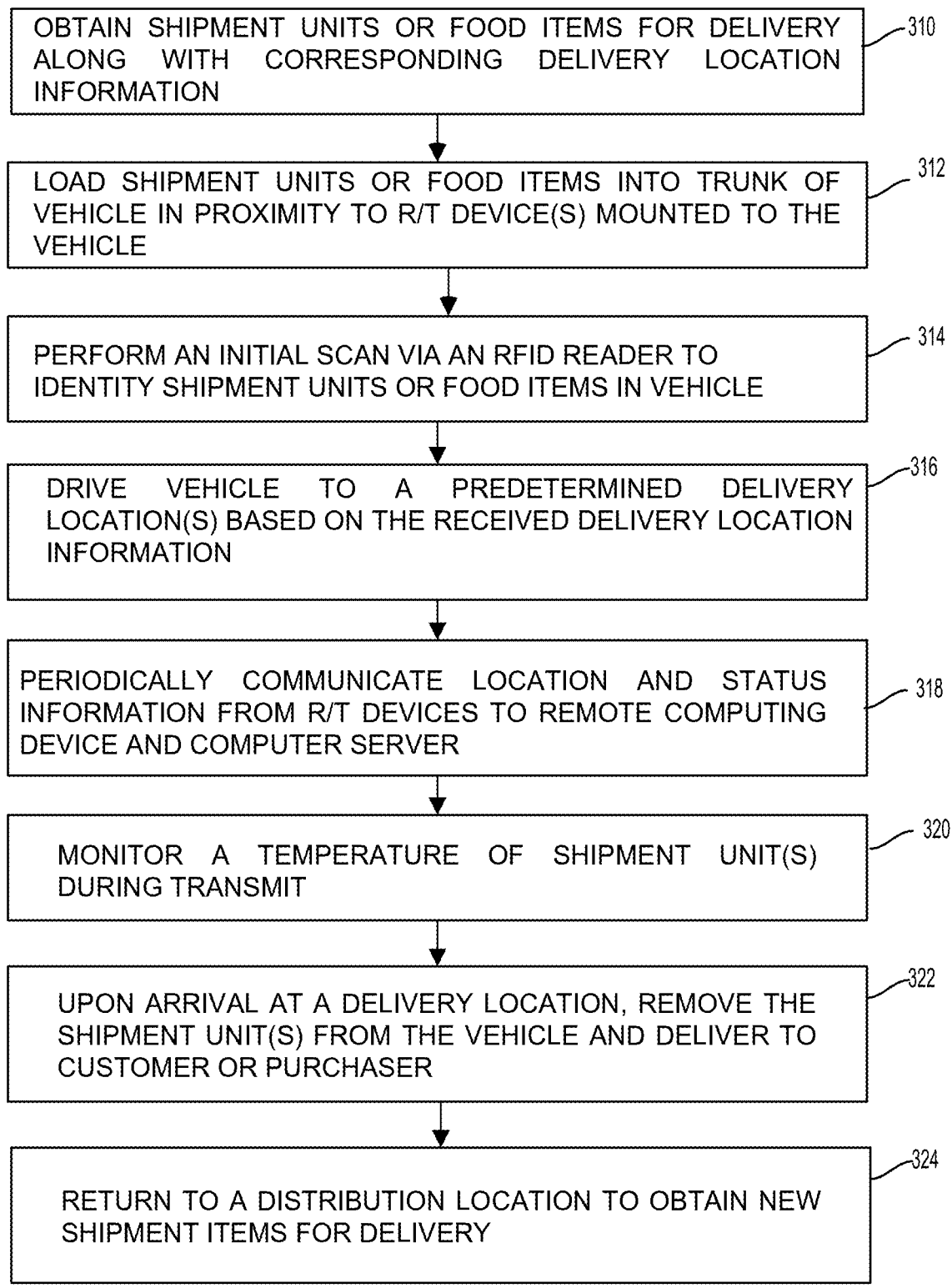
FIG. 6B is a flowchart showing a method for tracking shipment units using a shipping system including receiver/transmitter devices mounted to a vehicle, according to an aspect of the present disclosure.

FIG. 6B is a flowchart showing a method for tracking shipment units 56, such as food times, using the food delivery system 130 including the receiver/transmitter device 10 mounted to the vehicle 106. At step 310, the method can initially include obtaining one or more shipment units 56 or food items for delivery from a distribution location 132 along with corresponding delivery location information for each shipment unit 56. For example, the delivery information can be provided on an App on a driver's smartphone or vehicle navigation system.

At step 312, after the shipment units 56 are received from the distribution location 132, the driver or user can load the received shipment units 56 into the trunk of the vehicle 106 or into another container or enclosure of the vehicle 106 in proximity to the receiver/transmitter device 10.

At step 314, once the shipment units 56 are loaded in the vehicle 106 and in proximity to the receiver/transmitter device 10, the receiver/transmitter device 10 can perform an initial scan to identity the individual shipment units 56. For example, the RFID reader 16 of the receiver/transmitter device 10 can detect passive RFID tags 58 associated with each of the shipment units 56 to create a list of shipment units 56 in the vehicle 106. The list can be compared to the provided delivery information on the driver's smartphone or vehicle navigation system to confirm that all shipment units 56 or items for delivery are accounted for.

If the vehicle 106 is located within range of a UWB network 114, the information about shipment units 56 can be transmitted to a delivery database on the remote computing device 110 or computer server 112 by the UWB network 114. If UWB is not available, then data transmission can be by the cellular transmitter 12 over the cellular network 116.

At step 316, after confirming that all shipment units 56 are present, the driver can begin to drive the vehicle 106 to a first delivery location 134 as directed by the delivery information loaded on the smartphone or vehicle navigation system.

At step 318, during transit, the method can further include periodically communicating location and status information from receiver/transmitter devices 10 to the remote computing device 110 and computer server 112. Location information can be received by a remote computing device 110 or computer server 112 (e.g., the cloud) and relied upon to update the database of location/status data for the shipment units 56.

At step 320, the method can further comprise monitoring a temperature of shipment units 56 during transit to confirm that the food items remain at a correct or expected temperature. In some examples, temperature measurements can be obtained from the environmental sensor 22 (e.g., temperature sensor) of the receiver/transmitter device 10 as previously described. In other examples, as previously described, temperature measurements can be obtained from RFID tags 58 attached to the individual shipment units 56, which can be read by the RFID reader 16 of the receiver/transmitter device 10. In some examples, the receiver/transmitter devices 10 can be configured to emit periodic communications or blinks with location and status (e.g., temperature) information. The communications or blinks can be scheduled (e.g., occurring every 10 minutes, hour, or several times per day) or triggered in response to changes (e.g., changes in acceleration or temperature) detected by environmental sensors 22 of the receiver/transmitter devices 10. In some examples, the communications or blinks are transmitted by the cellular transmitter 12 of the receiver/transmitter device 10 over the cellular network 116. Alternatively, if UWB communication is available, data can be transmitted by the UWB transmitter 14 to conserve power. As previously described, the delivery information database on the remote computing device 110 or computer server 112 can be updated with location and status information for individual shipment units 56 based on the information received by the communications or blinks.

At step 322, upon arrival at a delivery location 134, the driver can remove one or more of the shipment units 56 from the trunk of the vehicle 56 and deliver the one or more shipment units 56 to the customer or purchaser. The receiver/transmitter device 10 can be configured to recognize when shipment units 56 are removed from the vehicle 106 based on information detected by the RFID reader 16 and/or other sensors 22 of the receiver/transmitter device 10. Information about which shipment units 56 have been removed from the vehicle 106 can also be transmitted to the remote computing device 110 or server 112 for updating the database of delivery items and/or for confirming that a particular item has been delivered.

The driver can continue to deliver shipment units 56 to different delivery locations 134, as directed by the delivery information on the App, until all shipment units 56 in the vehicle 106 are delivered. As previously described, if during delivery activities it is determined that items have been damaged or are not a correct temperature, price adjustments can be automatically made to account for the loss of quality. Also, if needed, a driver can be directed to return to the distribution location 132 to obtain a replacement shipment unit 56 to avoid delivering a low quality item to a purchaser or customer.

At step 324, after all shipment items 56 are delivered, the driver can return to the distribution location 132 to obtain new shipment items 56. In other examples, drivers may be directed to meet up with other drivers or vehicles 106 to obtain new shipment items 56 for delivery without needing to return to the distribution location 132.

Carbon Emission Detection and Reporting Methods

It is believed that the receiver/transmitter devices 10, systems 102, 130, and methods disclosed herein may empower manufacturers/producers to substantially reduce logistics costs by as much as about 20%, as well as significantly reducing production losses by about 20-80% of product value, depending on the industry. Also, information collected by the receiver/transmitter devices 10 and systems 102, 130 may be used to allow manufacturers and producers to gain control of timely shipments, preventing disruptions (temperature/shock damage, theft, counterfeiting, production line velocity reduction), increasing inventory turns, optimizing inventory management, and saving on warehousing costs. Item-level tracking can also enhance vehicle/driver utilization, minimizes errors, and reduces shipment spoilage and termination loss.

Another benefit is that opportunities for in-transit redirection to optimize product distribution and minimize waste can be more easily recognized and implemented. In particular, product locations can be optimized around the point/time of sale rather than estimated at the time of production. These logistics systems 102, 130 can also improve product availability and encourage retailers to find more useful homes for unused products before products are discarded or dumped (e.g., by donating unused food products to food banks). Efficiency can also be improved, for example, by automating actions such as canceling damaged orders in transit, re-ordering critical items when delays occur, and scheduling or re-routing orders to minimize processing labor and maximize delivery security.

As described above, information collected by a tracking and location or logistics system 102 can be used for confirming location of shipment units 56 within a shipping network. Using such substantial mobility information, logistics and manufacturing suppliers can adjust systems and processes to improve energy efficiency reducing carbon footprints attributable to shipping activities. It is estimated that only about 5% of supply chain emissions stem from direct manufacturing, with emissions within the entire supply chain being 5 to 10 times higher than emissions attributable directly to manufacturing. The World Economic Forum (WEF) recommends that companies decarbonize supply chains to significantly reduce their climate impact, especially in customer-facing sectors where end-to-end emissions exceed direct operations emissions. Accordingly, systems 102 that use location information to improve efficiency of shipping activities may substantially reduce emissions from manufactured goods compared to conventional practices.

The tracking and location information provided by the receiver/transmitter devices 10 and systems 102 of the present disclosure may also be relied upon to provide or generate carbon or fuel metrics, such as a measured total emissions metric, which can be crucial for enhancing sustainability and minimizing unnecessary fuel consumption. In particular, a key trend considered in determining Environmental, Social, and corporate Governance (ESG) scores for businesses and manufacturers is the ability to address and control Scope 3 emissions. The U.S. Environmental Protection Agency (EPA) guidance defines Scope 3 emissions as any emissions resulting from activities from assets not owned or controlled by the reporting organization, but that the organization indirectly affects in its value chain. Scope 3 emissions, also referred to as value chain emissions, often represent the majority of an organization's total greenhouse gas (GHG) emissions.

Analysts suggest that businesses are shifting (or will shift) to Scope 3 emissions instead of considering only Scope 1 (direct emissions) and Scope 2 (purchased energy/electricity) emissions data to comply with current or possible future environmental regulations. Total emissions for shipping activities, which can be measured by the receiver/transmitter devices 10 and logistics systems 102 of the present disclosure, are an important factor for determining Scope 3 emission data. Furthermore, although voluntary to date, the collection and reporting of Scope 3 emissions data may become a legal requirement in many countries, e.g. EU, US, UK, Australia, and Canada, making collection of total emission data for shipping activities important for compliance. The receiver/transmitter devices 10, systems 102, and computer-implemented methods of the present disclosure can be configured to provide data needed for Scope 3 emission analysis. In contrast to the direct measurement of emission data provided by the receiver/transmitter devices 10 and systems 102 disclosed herein, prior methods of carbon tracking or foot printing at the product level often rely solely on estimated values for determining emissions due to transit-related factors.

In some examples, emissions data generated by the receiver/transmitter devices 10 and systems 102 of the present disclosure may be used by consumers to make more informed choices between products from different sources and/or products delivered by different shipping options to limit environmental impact of their purchases. In particular, as described below, detailed information about shipment location may be used to generate measured sustainability metrics throughout an entire supply chain. The metrics can be presented to consumers to aid in decision making.

Figure 7:
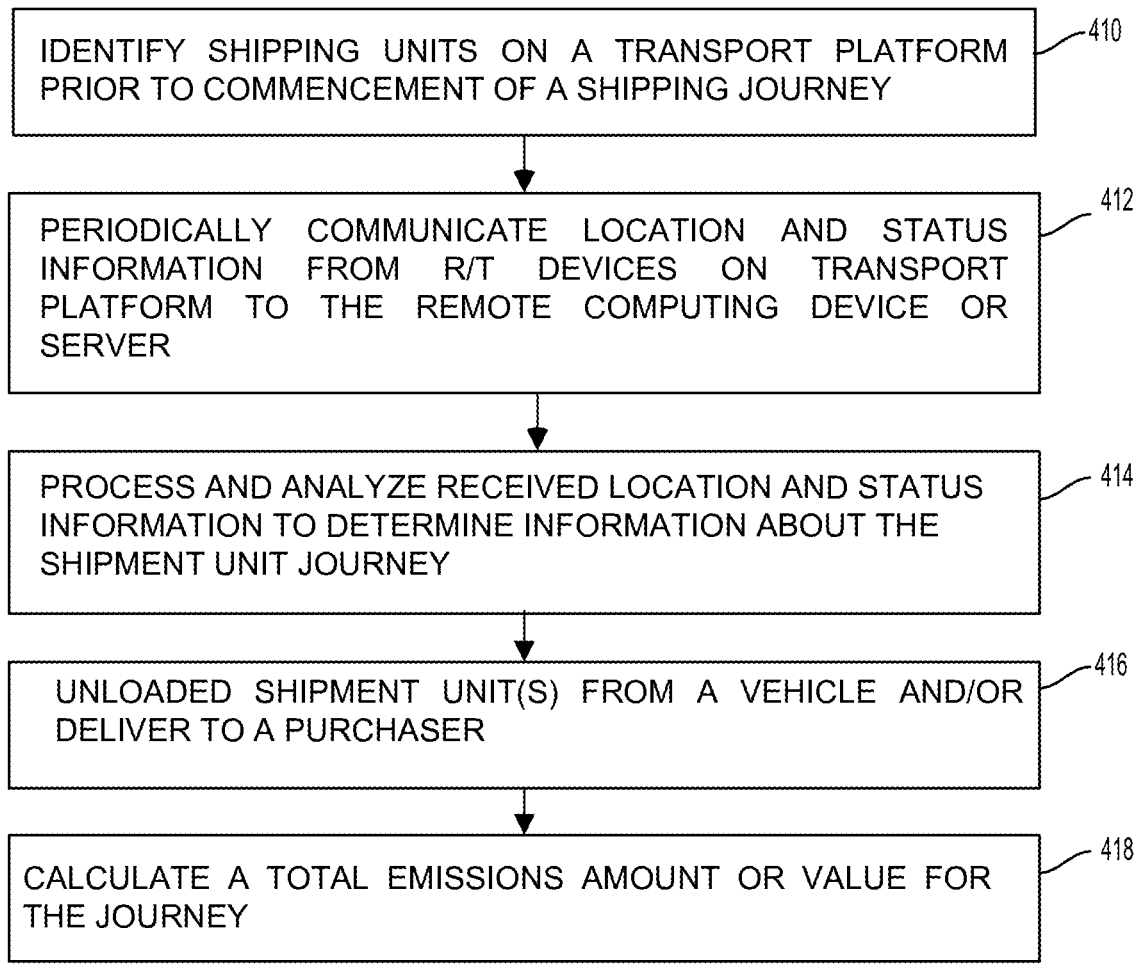
FIG. 7 is a flowchart showing a method for measuring total carbon emissions or a carbon footprint for a shipping activity, according to an aspect of the present disclosure.

FIG. 7 is a flowchart showing a method for measuring total carbon emissions or a carbon footprint for a shipping activity based on data collected by receiver/transmitter devices 10 configured for detecting one or more shipment units 56. At step 410, the method includes identifying shipment units 56 on a transport platform, such as a pallet 50, prior to commencement of a shipping journey. For example, as previously described, the RFID reader 16 of one or more receiver/transmitter devices 10 on a transport platform or pallet 50 can be configured to detect passive RFID tags 58 on or associated with each shipment unit 56.

At step 412, once the journey is underway, such as when the vehicle 106 departs from the shipment facility 104, the receiver/transmitter devices 10 for the transport platform or pallet 50 can be configured to periodically communicate location and status information from the receiver/transmitter devices 10 to the remote computing device 110 or server 112 on the cloud. The transmitted location and status information can include an indication that each shipment unit 56 is still on board the particular transport platform or pallet 50 determined based on signals detected by the RFID reader 16. The location information also includes information about the geographic location of the receiver/transmitter devices 10 determine, for example, based on location technologies including, for example, Wi-Fi sniffing (locally 10-100 m accuracy) or cellular E-911 (globally 100 m accuracy), as well as UWB (10 cm accuracy on premises) or GPS (10 m accuracy) location information when the receiver/transmitter device 10 is attached to an external power source. The status information for the receiver/transmitter devices 10 can comprise acceleration information or data documenting vibrations experienced by the receiver/transmitter devices 10 and shipment units 56 during transmit. As previously described, the location and status information can be transmitted as periodic (e.g., scheduled or triggered) blinks emitting from the cellular transmitter 12 or UWB transmitter 14 of the receiver/transmitter device 10 and transmitted over the UWB network 114 or cellular network 116 to the remote computing device 110 or server 112.

At step 414, upon receipt of the communication blinks from the receiver/transmitter devices 10, the remote computing device 110 or server 112 can be configured to process and analyze received location and condition information to determine information about the shipment unit 56 journey. For example, the location and status information can be analyzed to determine what type of vehicle the shipment unit 56 is being transported in and to draw conclusions about vehicle fuel usage. In some examples, determining the type of vehicle (e.g., gas powered vehicle, electric vehicle, passenger automobile, truck, train, or aircraft) can comprise analyzing acceleration data provided by the receiver/transmitter device 10 to identify vibrations or accelerations characteristic of certain types of vehicles. For example, a gas powered vehicle may accelerate faster than an electric vehicle meaning that different acceleration rates may be used to identify vehicle type. In a similar manner, trains change speed very slowly and rarely stop completely meaning that velocity or acceleration values for trains remain generally consistent throughout a journey. In other examples, location information can be used to identify the vehicle type. For example, location information showing that a vehicle is traveling over water may indicate that the vehicle is a ship or aircraft.

At step 416, upon arrival at a final destination, shipment units 56 can be unloaded from a vehicle and/or delivered to a purchaser. As previously described, the system 102 can be configured to confirm that a journey is complete based on location and condition information provided by the receiver/transmitter device 10.

Once the journey is completed, at step 418, a total emission for the journey can be calculated. The total emission can be based on a duration of travel for each vehicle identified during journey determined based on capture time information for blinks transmitted during the journey, distance traveled by the vehicle determined based on location information for the receiver/transmitter devices 10 received during the journey and known emission rates for the identified vehicle(s). In some instances, location and status information obtained by the receiver/transmitter device 10 can be used to further refine emissions measurements. For example, temperature information may be used to determine whether it is likely that air conditioning is turned on for the vehicle during the journey, which would reduce fuel efficiency of the vehicle. Also, information about vehicle speed and/or number of stops may be used to improve accuracy of emission rates for the vehicle. For example, a vehicle that travels at a high top speed and/or that accelerates and decelerates frequently may be less fuel efficient than a vehicle driven in a more consistent manner. Once known, the total emissions for a shipping activity or journey can be provided to interested parties, such as producers, consumers, or government organizations for providing an accurate fuel use and total emissions record for a particular product and shipping method.

In some examples, a total emissions value or total carbon footprint metric for a particular manufactured product can be based on measured total emissions for journeys for both the final manufactured product, which can be calculated as described in FIG. 7, and for all parts used to build the product. In order to determine such a total emissions value or total carbon footprint metric, it is necessary to know the measured total emissions for the constituent parts that form the product. Such total emissions values for each constituent part can be tracked and calculated using the receiver/transmitter devices 10 of the present disclosure. These values can be provided, for example, in a cloud database for a particular manufacturer or supplier. In some examples, a bill of materials for a final product includes serial numbers of all parts in the product. In such instances, emissions values for the constituent parts of a product can be obtained from the cloud database based on the serial number for each part. Once the total emissions values for both the parts and final manufactured product are known, the total emissions value or total carbon footprint metric can be calculated. This total emissions value or carbon footprint metric includes all measured values needed to provide a full scope 3 footprint for the manufactured product. Determining this metric or value can be complex requiring manufacturers to track the serial numbered items from their supplier(s). However, such information can be easily determined when supplier(s) use the receiver/transmitter devices 10 of the present disclosure to measure and transmit this information to the cloud. Furthermore, in some examples, it is also possible to average a set of products that will all have slightly different measured carbon footprints to get an averaged figure for the carbon footprint of a product model number.

Figure 8A:
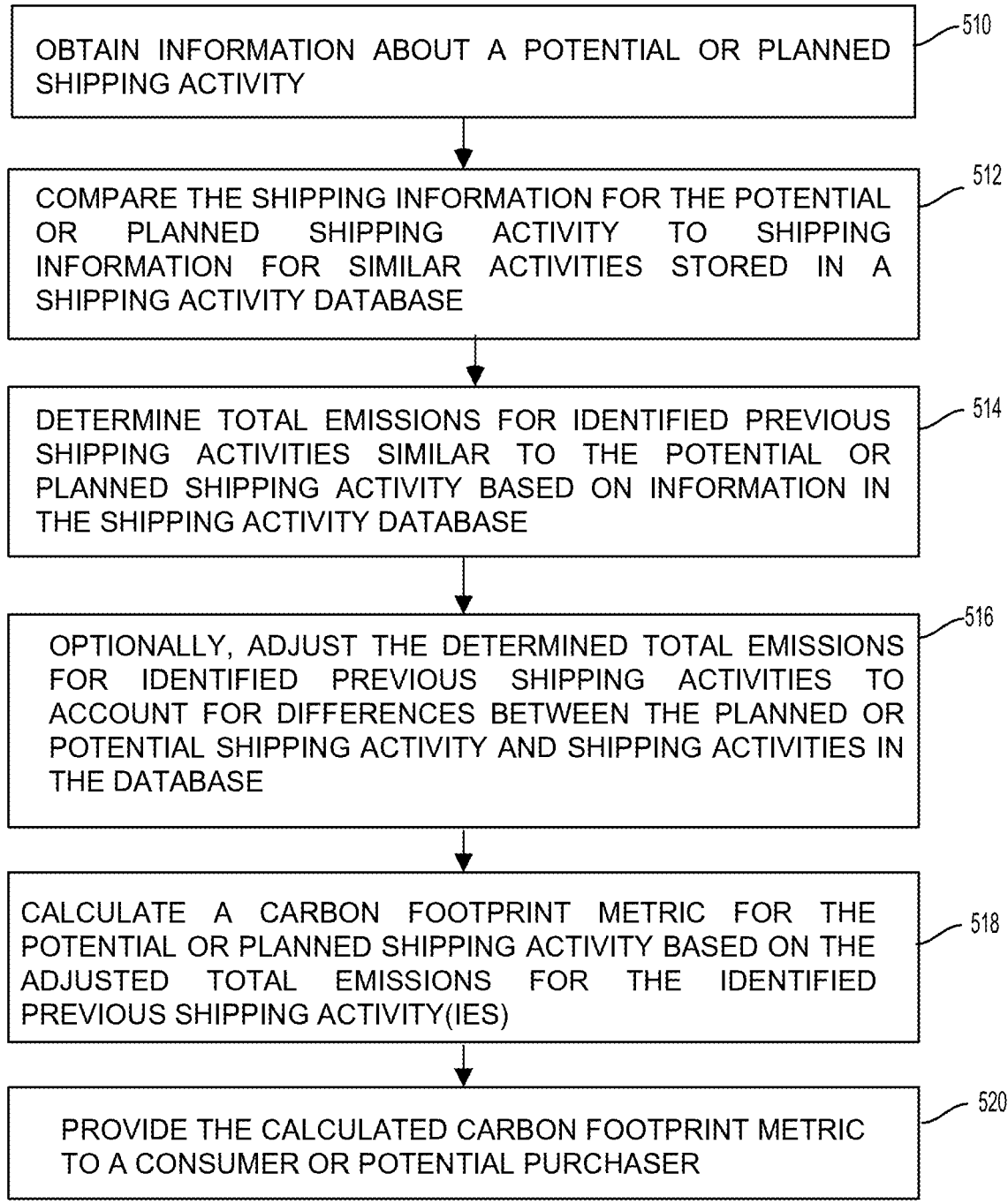
FIG. 8A is a flowchart showing a method for calculating a carbon footprint metric for a shipping activity, according to an aspect of the present disclosure.
Figure 8B:
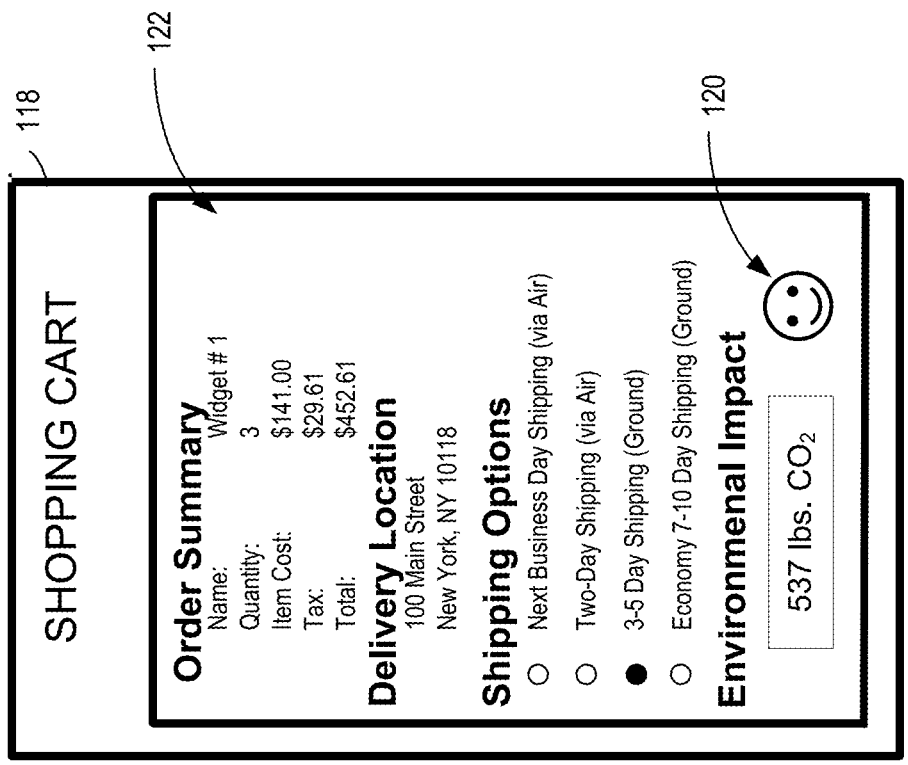
FIG. 8B is a schematic drawing of a user interface screen showing a carbon footprint metric displayed along with shipping and purchasing information, according to an aspect of the present disclosure.

FIG. 8A is a flowchart showing a method for calculating a carbon footprint metric 120 for a shipping activity based on data collected by receiver/transmitter devices 10. FIG. 8B shows a screen capture 118 for a website or user interface for presenting the carbon footprint metric 120 to a customer or potential purchaser.

At step 510, the method for calculating the carbon footprint metric comprises initially obtaining information about a potential or planned shipping activity. For example, the shipping activity information can include information about a departure location, delivery location, travel duration, means of transport, and any other information needed to fully characterize carbon impact of the potential or planned shipping activity.

At step 512, the method further comprises comparing the shipping information for the potential or planned shipping activity to a shipping activity database comprising measured emission data (e.g., total carbon emissions) for previously performed shipping activities. The shipping activity database can be created by recording total emission data for numerous shipping activities performed by a shipping company or business. As described previously, the total emission information can be determined based on location and status information for individual shipping units 56 collected by the receiver/transmitter devices 10 of the present disclosure following, for example, the method shown in FIG. 7. Based on the comparison between the shipping information for the potential or planned shipping activity and previously performed shipping actions recorded in the shipping activity database, the method can comprise identifying one or more previous shipping activities sharing common characteristics with the potential or planned shipping activity.

At step 514, the method further comprises determining the total emissions for identified previous shipping activities similar to the potential or planned shipping activity based on information in the shipping activity database. If multiple similar shipping activities are identified, then total emission for the multiple activities can be considered together. For example, an average value (e.g., a median or mode value) for total emissions can be calculated from total emissions for the multiple similar activities.

Optionally, at step 516, the determined total emissions for identified previous shipping activities can be adjusted or modified to account for differences between the planned or potential shipping activity and shipping activities in the database. For example, the total emissions can be modified to account for differences in travel duration and/or distance traveled distance. Also, other factors, such as the means of transportation, expected traffic or weather conditions, or any likely logistics delays can be considered when adjusting the total emissions for the identified previous shipping activity or activities.

At step 518, one the adjusted or modified total emissions value is known, a carbon footprint metric for the potential or planned shipping activity can be calculated. In some examples, the carbon footprint metric can be a numeric value for the total amount of carbon material (e.g., carbon dioxide and carbon monoxide) released due to the shipping activity. For example, the metric can be provided in terms of pounds carbon dioxide (lbs. $CO_2$). In other examples, the carbon footprint metric can be a presented as a dimensionless score, such as an alpha numeric score (e.g., A, B, C, D, E) or icon (e.g., a smiley face, frown face, or neutral expression), representing whether a particular shipping activity has a high or low total emission value. For example, the score could be based on whether the adjusted or modified total emissions value is above or below certain thresholds. In other examples, the score can be determined by comparing a total emissions value for a particular potential or planned shipping action to total emissions for alternative shipping actions. Potential or planned shipping actions with lower total emission values than similar alternative shipping activities can receive a high score (e.g., an A-grade or smiley face), while potential or planned shipping activities with total emissions values that are far higher than alternative shipping actions may receive a low score (e.g., an F-grade or frown face).

At step 520, once the carbon footprint metric is known, the method comprises providing the calculated carbon footprint metric to a consumer or potential purchaser. For example, as shown in the screen capture 118 in FIG. 8B, the carbon footprint metric 120 can be displayed on a webpage or user interface screen near to purchasing information 122. Showing the carbon footprint metric 120 along with purchasing information 122 allows the consumer to consider environmental impacts of planned purchases and/or shipping options prior to making the purchase. By considering the carbon footprint metric 120, the potential purchaser can consider whether it may make sense based on environmental considerations to purchase a product from other distributors or to use other shipping options to reduce carbon emissions. In some examples, the website or user interface can also be configured to suggest alternative shipping or purchase options that have a better carbon footprint metric 120 and/or higher score. Accordingly, logistics data collected by the systems 102 and receiver/transmitter devices 10 of the present disclosure can encourage more responsible consumer activity, thereby reducing carbon output attributable to supply chains and shipping activities.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements. Furthermore, it is to be understood that the present invention contemplates that, to the extent possible, one or more features of any embodiment can be combined with one or more features of any other embodiment.

The invention claimed is:

1. A receiver/transmitter device for logistics tracking configured to monitor or detect at least one shipment unit, comprising:
    at least one cellular transmitter for transmission of wireless signals via a cellular network;
    at least one ultra-wide band (UWB) transmitter for transmission of radio signals over a short-range network;
    at least one radio frequency identification (RFID) reader configured to detect at least one passive RFID tag associated with the at least one shipment unit;
    at least one processor in communication with the at least one cellular transmitter, the at least one UWB transmitter, and the at least one RFID reader configured to:
        selectively cause the at least one cellular transmitter or the at least one UWB transmitter to wirelessly transmit information detected by the at least one RFID reader to a remote computing device or computer server,
        receive location information based on signals received by the at least one UWB transmitter and/or the at least one RFID reader, and
        cease communication via the at least one cellular transmitter when the location information indicates that the receiver/transmitter device is within a facility including a UWB and/or RFID gateway; and
    a housing configured to be mounted to a transport platform that encloses the at least one cellular transmitter, the at least one UWB transmitter, the at least one RFID reader, and the at least one processor.

2. The device of claim 1, wherein the housing is configured to fit between horizontal slats of the transport platform and comprises at least one fastener receiver configured to receive a fastener for securing the housing to one or more of the horizontal slats.

3. The device of claim 1, wherein the housing is configured to fit between horizontal slats of the transport platform and comprises at least one fastener receiver configured to receive a fastener for securing the housing to one or more of the horizontal slats, and
    wherein the at least one fastener receiver is rotatable relative to the housing, such that, upon rotation, teeth on an outer surface of the at least one fastener receiver dig into one or more of the horizontal slats for securing the housing to the transport platform.

4. The device of claim 1, further comprising an adhesive pad attached to an exterior surface of the housing for mounting the housing to the transport platform.

5. The device of claim 1, further comprising a QR code or passive RFID tag on an exterior surface of the housing for identifying individual receiver/transmitter devices when a battery of the receiver/transmitter device is fully deleted.

6. The device of claim 1, further comprising a battery enclosed within the housing for providing power for the at least one cellular transmitter, the at least one UWB transmitter, the at least one RFID reader, and the at least one processor,
wherein the battery is non-rechargeable, and the receiver/transmitter device is disposable providing at least 20,000 blinks that transmit the detected information prior to depletion of the battery.

7. The device of claim 6, wherein the at least one processor is configured to apportion battery power from the battery by radio type providing about 90% of the battery power for the at least one cellular transmitter, about 9% of the battery power for the at least one RFID reader, and about 1% of the battery power for the at least one UWB transmitter.

8. The device of claim 1, further comprising a separate power bank configured to be connected to the transport platform in proximity to the receiver/transmitter device and electrically connected to the receiver/transmitter device for providing power for the at least one cellular transmitter, the at least one UWB transmitter, the at least one RFID reader, and the at least one processor.

9. The device of claim 1, wherein ceasing cellular communication comprises ceasing to apply power from a battery of the receiver/transmitter device to the at least one cellular transmitter.

10. The device of claim 1, further comprising at least one environmental sensor enclosed within the housing configured for detection of at least one of temperature, humidity, shock, and/or vibration of or proximate to the receiver/transmitter device.

11. The device of claim 1, further comprising at least one energy harvester enclosed within a separate housing and electrically connected to the at least one cellular transmitter, the at least one UWB transmitter, the at least one RFID reader, and/or the at least one processor by an electrical cable.

12. The device of claim 1, wherein the at least one processor is configured to:
cause the at least one cellular transmitter or the at least one UWB transmitter to wirelessly transmit the information from the at least one passive RFID tag detected by the at least one RFID reader upon an initial detection of the at least one passive RFID tag; and
subsequently cause the at least one cellular transmitter or the at least one UWB transmitter to periodically wirelessly transmit a confirmation that the at least one passive RFID tag remains within range of the at least one RFID reader to the remote computing device or computer server, wherein the transmitted confirmation is smaller in size than the information transmitted upon the initial detection of the at least one passive RFID tag.

13. A receiver/transmitter device for logistics tracking configured to monitor or defect at least one shipment unit, comprising:
at least one cellular transmitter for transmission of wireless signals via a cellular network;
at least one ultra-wide band (UWB) transmitter for transmission of radio signals over a short-range network, wherein the at least one UWB transmitter is configurable to operate as an anchored UWB gateway at a shipping facility or warehouse for on premise detection of other mobile devices comprising UWB transmitters;
at least one radio frequency identification (RFID) reader configured to detect at least one passive RFID tag associated with the at least one shipment unit;
at least one processor in communication with the at least one cellular transmitter, the at least one UWB transmitter, and the at least one RFID reader configured to selectively cause the at least one cellular transmitter or the at least one UWB transmitter to wirelessly transmit information detected by the at least one RFID reader to a remote computing device or computer server; and
a housing configured to be mounted to a transport platform that encloses the at least one cellular transmitter, the at least one UWB transmitter, the at least one RFID reader, and the at least one processor.

14. The device of claim 13, further comprising a battery enclosed within the housing for providing power for the at least one cellular transmitter, the at least one UWB transmitter, the at least one RFID reader, and the at least one processor,
wherein the at least one processor is configured to apportion battery power from the battery by radio type providing about 90% of the battery power for the at least one cellular transmitter, about 9% of the battery power for the at least one RFID reader, and about 1% of the battery power for the at least one UWB transmitter.

15. A receiver/transmitter device for logistics tracking configured to monitor or detect at least one shipment unit, comprising
at least one cellular transmitter for transmission of wireless signals via a cellular network;
at least one ultra-wide band (UWB) transmitter for transmission of radio signals over a short-range network;
at least one radio frequency identification (RFID) reader configured to detect at least one passive RFID tag associated with the at least one shipment unit;
at least one environmental sensor configured to detect acceleration and temperature information for the receiver/transmitter device;
at least one processor in communication with the at least one cellular transmitter, the at least one UWB transmitter, the at least one RFID reader, and the at least one environmental sensor configured to:
selectively cause the at least one cellular transmitter of the at least one UWB transmitter to wirelessly transmit information detected by the at least one RFID reader to a remote computing device or computer server, and
modify power usage of the at least one cellular transmitter, the at least one UWB transmitter, the at least one RFID reader, or the at least one processor based on detected changes in the acceleration and temperature information; and
a housing configured to be mounted to a transport platform that encloses the at least one cellular transmitter, least one UWB transmitter, the at least one RFID reader, the at least one environmental sensor, and the at least one processor.

16. The device of claim 15, wherein the at least one processor is configured to receive location information based on signals received by the at least one UWB transmitter and/or the at least one RFID reader and to cease communication via the at least one cellular transmitter when location information indicates that the receiver/transmitter device is within a facility including a UWB and/or RFID gateway.

17. The device of claim 15, wherein the at least one processor is configured to increase a blink rate for communication of detected information for one or more of the at least one cellular transmitter or the at least one UWB transmitter upon the detected change in the acceleration or temperature information.

18. The device of claim 15, further comprising a battery enclosed within the housing for providing power for the at least one cellular transmitter, the at least one UWB transmitter, the at least one RFID reader, and the at least one processor,
wherein the battery is non-rechargeable, and the receiver/transmitter device is disposable providing at least 20,000 blinks that transmit the detected information prior to depletion of the battery.

19. A system for logistics tracking for monitoring shipment units within a shipment network, the system comprising:
a plurality of receiver/transmitter (R/T) devices mounted to transport platforms for the shipment units, wherein the plurality of receiver/transmitter devices comprise:
at least one cellular transmitter for transmission of wireless signals via a cellular network;
at least one ultra-wide band (UWB) transmitter for transmission of radio signals over a short-range network;
at least one radio frequency identification (RFID) reader configured to detect at least one passive RFID tag associated with the shipment unit;
at least one environmental sensor for measuring acceleration and/or temperature of the shipment units;
at least one R/T device processor in communication with the at least one cellular transmitter, the at least one UWB transmitter, the at least one environmental sensor, and the at least one RFID reader; and
a housing configured to be mounted to a transport platform that encloses the at least one cellular transmitter, the at least one UWB transmitter, the at least one RFID reader, the at least one environmental sensor, and the at least one R/T device processor; and
a remote computing device or server comprising at least one processor in wireless communication with the at least one R/T processor of the plurality of receiver/transmitter devices, the at least one processor of the remote computing device or server being configured to:
receive and process signals emitted from the plurality of receiver/transmitter devices;
determine location and status information for the shipment units secured to the transport platforms based on the received and processed signals;
generate or update a location database comprising the determined location and status information for shipment units within the shipment network; and
determine a measured total carbon emissions for a particular shipment unit based on the determined location and status information and the acceleration or temperature of the particular shipment unit.

20. The system of claim 19, wherein the at least one processor of the remote computing device or server is further configured to:
estimate an arrival time for a particular shipment unit based on the determined location and status information for the particular shipment unit, and
periodically update the estimated arrival time based on newly obtained location and status information for the particular shipment unit.

* * * * *

UNITED STATES PATENT AND TRADEMARK OFFICE
CERTIFICATE OF CORRECTION

PATENT NO. : 12,229,620 B2  
APPLICATION NO. : 18/763479  
DATED : February 18, 2025  
INVENTOR(S) : Stephen Pearce It is certified that error appears in the above-identified patent and that said Letters Patent is hereby corrected as shown below:

In the Claims

Column 41, Line 64, Claim 13, delete "defect" and insert -- detect --

Column 42, Line 50, Claim 15, delete "of" and insert -- or --

Column 42, Line 61, Claim 15, after "transmitter," insert -- the at --

Signed and Sealed this  
Twenty-second Day of April, 2025

Coke Morgan Stewart  
*Acting Director of the United States Patent and Trademark Office*